United States Patent
Matsumaru et al.

(10) Patent No.: US 8,827,808 B2
(45) Date of Patent: Sep. 9, 2014

(54) GAME DEVICE, METHOD OF CONTROLLING A GAME DEVICE, AND NON-TRANSITORY INFORMATION STORAGE MEDIUM

(71) Applicant: Konami Digital Entertainment Co., Ltd., Tokyo (JP)

(72) Inventors: Hajime Matsumaru, Shinjuku-ku (JP); Keisuke Kariya, Nakano-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 25 days.

(21) Appl. No.: 13/657,229

(22) Filed: Oct. 22, 2012

(65) Prior Publication Data

US 2013/0109478 A1    May 2, 2013

(30) Foreign Application Priority Data

Nov. 1, 2011    (JP) ................. 2011-240091

(51) Int. Cl.
*A63F 13/10* (2006.01)
*A63F 13/40* (2014.01)
*A63F 13/219* (2014.01)

(52) U.S. Cl.
CPC ......... *A63F 13/04* (2013.01); *A63F 2300/1093* (2013.01); *A63F 2300/6045* (2013.01); *A63F 2300/6607* (2013.01); *A63F 13/10* (2013.01); *A63F 2300/65* (2013.01)
USPC ............................................... 463/36; 463/4

(58) Field of Classification Search
CPC ..... A63F 7/0616; A63F 13/005; A63F 13/04; A63F 13/10; A63F 2300/1087; A63F 2300/1093; A63F 2300/8011
USPC ................................................. 463/4, 36–39
See application file for complete search history.

(56) References Cited

U.S. PATENT DOCUMENTS

| | | | | |
|---|---|---|---|---|
| 4,836,670 | A * | 6/1989 | Hutchinson | 351/210 |
| 6,373,961 | B1 * | 4/2002 | Richardson et al. | 382/103 |
| 7,762,665 | B2 * | 7/2010 | Vertegaal et al. | 351/209 |
| 2009/0136091 | A1 * | 5/2009 | Woodfill et al. | 382/106 |
| 2010/0201621 | A1 * | 8/2010 | Niikawa | 345/158 |
| 2011/0118015 | A1 * | 5/2011 | Yamamoto et al. | 463/30 |
| 2011/0161890 | A1 * | 6/2011 | Anderson et al. | 715/863 |
| 2012/0244935 | A1 * | 9/2012 | Burckart et al. | 463/30 |
| 2012/0272179 | A1 * | 10/2012 | Stafford | 715/781 |
| 2012/0295708 | A1 * | 11/2012 | Hernandez-Abrego et al. | 463/36 |

FOREIGN PATENT DOCUMENTS

JP    2005-103154 A    4/2005

\* cited by examiner

*Primary Examiner* — Dmitry Suhol
*Assistant Examiner* — David Duffy
(74) *Attorney, Agent, or Firm* — Sughrue Mion, PLLC

(57) ABSTRACT

A game device acquires gazing position information relating to a position where a game player is gazing at a game screen, and a first determination unit determines whether or not the game player is aware of a game character based on the gazing position information and a position of the game character. A second determination unit determines whether or not the game character is aware of a virtual viewpoint or an operation subject of the game player based on the position and a sight line of the game character and a position of the virtual viewpoint or the operation subject of the game player. An action control unit causes the game character to perform an action corresponding to the gazing position information or a predetermined action based on determination results obtained by the first determination unit and the second determination unit.

15 Claims, 18 Drawing Sheets

| ACQUISITION TIME | GAZING POSITION INFORMATION |
|---|---|
| ta | (Xa, Ya) |
| tb | (Xb, Yb) |
| tc | (Xc, Yc) |

FIG.12
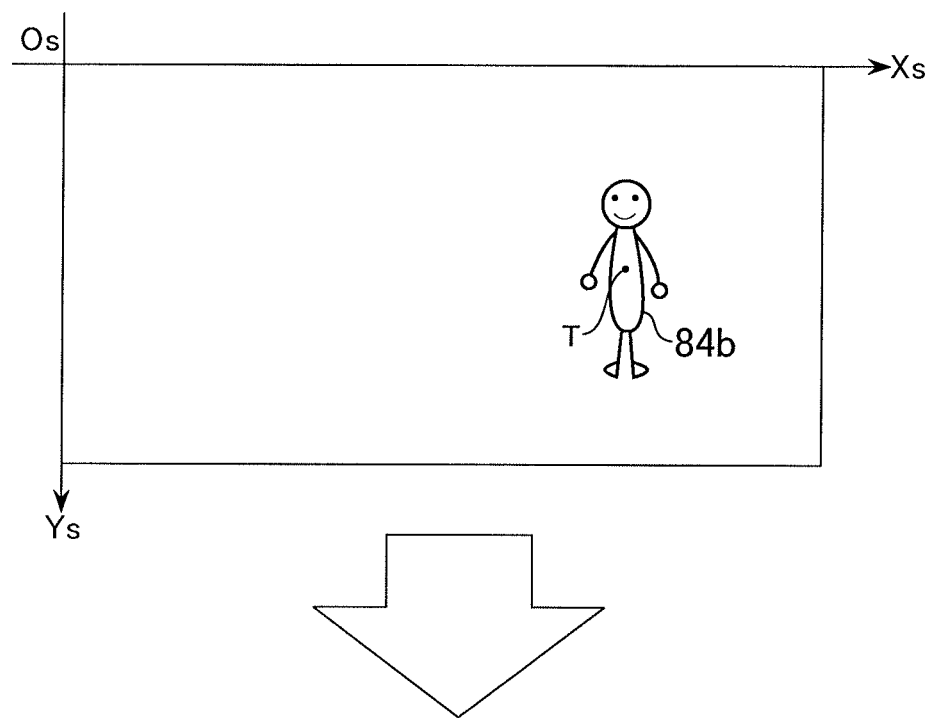
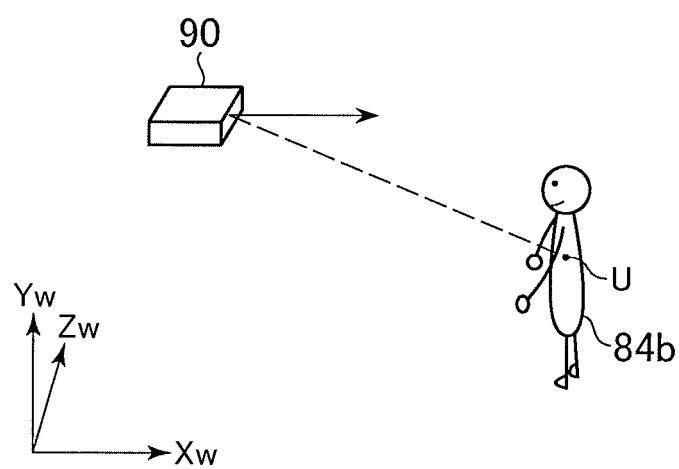

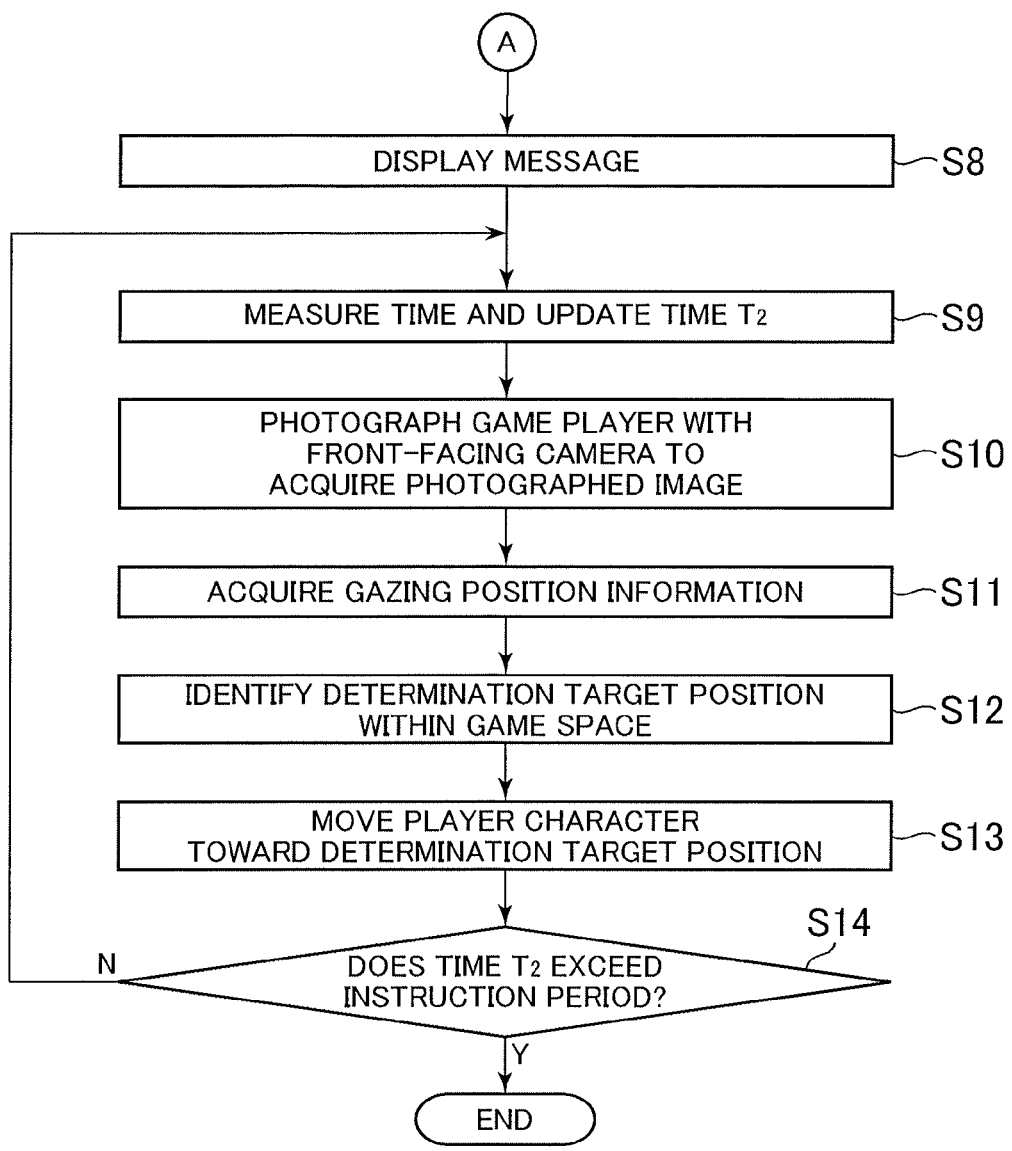

| COOPERATIVENESS PARAMETER (P) | REFERENCE PERIOD |
|---|---|
| P < 60 | 2 SECONDS |
| 60 ≦ P < 80 | 1 SECOND |
| 80 ≦ P | 0.5 SECONDS |

| COOPERATIVENESS PARAMETER (P) | STANDBY PERIOD |
|---|---|
| P < 60 | 1 SECOND |
| 60 ≦ P < 80 | 0.5 SECONDS |
| 80 ≦ P | 0 SECOND |

| COOPERATIVENESS PARAMETER (P) | INSTRUCTION PERIOD |
|---|---|
| P < 60 | 0.3 SECONDS |
| 60 ≦ P < 80 | 0.5 SECONDS |
| 80 ≦ P | 1 SECOND |

GAME DEVICE, METHOD OF CONTROLLING A GAME DEVICE, AND NON-TRANSITORY INFORMATION STORAGE MEDIUM

CROSS-REFERENCE TO RELATED APPLICATION

The present application claims priority from Japanese application JP 2011-240091 filed on Nov. 1, 2011, the content of which is hereby incorporated by reference into this application.

BACKGROUND OF THE INVENTION

1. Field of the Invention

The present invention relates to a game device, a method of controlling a game device, and a non-transitory information storage medium.

2. Description of the Related Art

Up to now, there is known a technology for allowing a game player to issue an instruction to a game character other than an operation subject while operating the operation subject. Japanese Patent Application Laid-open No. 2005-103154 discloses a game device which allows the game player to issue an instruction to the game character (for example, second game character) other than the operation subject by using a second operation member ("B button" of a controller) while operating the operation subject (for example, first game character) by using a first operation member ("A button" of the controller).

SUMMARY OF THE INVENTION

However, for example, in the technology disclosed in Japanese Patent Application Laid-open No. 2005-103154, a game player issues an instruction to a game character other than an operation subject while operating the operation subject, which means that the game player simultaneously performs an operation of a first operation member and an operation of a second operation member. It is difficult for the game player to simultaneously perform a plurality of kinds of operation by using a plurality of operation members, and hence, with the technology disclosed in Japanese Patent Application Laid-open No. 2005-103154, it may be hard for the game player to issue an instruction to the game character other than the operation subject.

The present invention has been made in view of the above-mentioned problem, and an object thereof is to provide a game device, a method of controlling a game device, and a non-transitory information storage medium which allow a game player to easily issue an instruction to a game character other than an operation subject while operating the operation subject.

In order to solve the above-mentioned problem, according to an exemplary embodiment of the present invention, there is provided a game device for executing a game configured so that a game character moves within a game space, including: means for acquiring information relating to a position of the game character and a sight line thereof from means for storing the information; display control means for causing display means to display a game screen showing how the game space is viewed from a virtual viewpoint; means for acquiring gazing position information relating to a position where a game player is gazing at the game screen based on an image obtained by photographing means for photographing a face of the game player; first determination means for determining whether or not the game player is aware of the game character based on the gazing position information and the position of the game character; second determination means for determining whether or not the game character is aware of one of the virtual viewpoint and an operation subject of the game player based on the position and the sight line of the game character and a position of the one of the virtual viewpoint and the operation subject of the game player; and action control means for causing the game character to perform one of an action corresponding to the gazing position information and a predetermined action based on determination results obtained by the first determination means and the second determination means.

Further, according to an exemplary embodiment of the present invention, there is provided a method of controlling a game device for executing a game configured so that a game character moves within a game space, the method including: a step of acquiring information relating to a position of the game character and a sight line thereof from means for storing the information; a display control step of causing display means to display a game screen showing how the game space is viewed from a virtual viewpoint; a step of acquiring gazing position information relating to a position where a game player is gazing at the game screen based on an image obtained by photographing means for photographing a face of the game player; a first determination step of determining whether or not the game player is aware of the game character based on the gazing position information and the position of the game character; a second determination step of determining whether or not the game character is aware of one of the virtual viewpoint and an operation subject of the game player based on the position and the sight line of the game character and a position of the one of the virtual viewpoint and the operation subject of the game player; and an action control step of causing the game character to perform one of an action corresponding to the gazing position information and a predetermined action based on determination results in the first determination step and the second determination step.

Further, according to an exemplary embodiment of the present invention, there is provided a program for causing a computer to function as a game device for executing a game configured so that a game character moves within a game space, the game device including: means for acquiring information relating to a position of the game character and a sight line thereof from means for storing the information; display control means for causing display means to display a game screen showing how the game space is viewed from a virtual viewpoint; means for acquiring gazing position information relating to a position where a game player is gazing at the game screen based on an image obtained by photographing means for photographing a face of the game player; first determination means for determining whether or not the game player is aware of the game character based on the gazing position information and the position of the game character; second determination means for determining whether or not the game character is aware of one of the virtual viewpoint and an operation subject of the game player based on the position and the sight line of the game character and a position of the one of the virtual viewpoint and the operation subject of the game player; and action control means for causing the game character to perform one of an action corresponding to the gazing position information and a predetermined action based on determination results obtained by the first determination means and the second determination means.

Further, according to an exemplary embodiment of the present invention, there is provided a non-transitory computer readable information storage medium having recorded thereon the above-mentioned program.

According to the exemplary embodiments of the present invention, the game player can easily issue an instruction to the game character other than the operation subject while operating the operation subject.

Further, according to the exemplary embodiment of the present invention, the action control means causes the game character to perform the one of the action corresponding to the gazing position information and the predetermined action when it is determined that the game player is aware of the game character and when it is determined that the game character is aware of the one of the virtual viewpoint and the operation subject of the game player.

Further, according to the exemplary embodiment of the present invention, the action control means includes means for determining whether or not a state in which it is determined that the game player is aware of the game character and in which it is determined that the game character is aware of the one of the virtual viewpoint and the operation subject of the game player has continued for a reference period, and the action control means causes the game character to perform the one of the action corresponding to the gazing position information and the predetermined action when the state is determined to have continued for the reference period.

Further, according to the exemplary embodiment of the present invention, the game space includes at least a first game character being the operation subject of the game player and a second game character that are disposed therein, the first determination means determines whether or not the game player is aware of the second game character based on the gazing position information and a position of the second game character, the second determination means determines whether or not the second game character is aware of one of the virtual viewpoint and the first game character based on a position and a sight line of the second game character and a position of the one of the virtual viewpoint and the first game character, the action control means further includes means for determining whether or not a state in which it is determined that the game player is aware of the second game character and in which it is determined that the second game character is aware of the one of the virtual viewpoint and the first game character has continued for the reference period, the action control means causes the second game character to perform the one of the action corresponding to the gazing position information and the predetermined action when the state is determined to have continued for the reference period, and the game device further includes: means for acquiring a game parameter from means for storing the game parameter in association with a combination of a plurality of the game characters; and reference period determination means for determining a length of the reference period based on the game parameter associated with a combination of the first game character and the second game character.

Further, according to the exemplary embodiment of the present invention, the game space includes at least a first game character being the operation subject of the game player and a second game character that are disposed therein, the first determination means determines whether or not the game player is aware of the second game character based on the gazing position information and a position of the second game character, the second determination means determines whether or not the second game character is aware of one of the virtual viewpoint and the first game character based on a position and a sight line of the second game character and a position of the one of the virtual viewpoint and the first game character, the action control means causes the second game character to perform the one of the action corresponding to the gazing position information and the predetermined action based on the determination results obtained by the first determination means and the second determination means, and the game device further includes: means for acquiring a game parameter from means for storing the game parameter in association with a combination of a plurality of the game characters; and restriction means for restricting action control on the second game character performed by the action control means based on the game parameter associated with a combination of the first game character and the second game character.

Further, according to the exemplary embodiment of the present invention, the restriction means further includes standby means for causing a start of execution of the action control on the second game character, which is performed by the action control means, to stand by based on the game parameter associated with the combination of the first game character and the second game character.

Further, according to the exemplary embodiment of the present invention, the action control means causes the game character to perform an action based on a change of the gazing position information during an instruction period after it is determined that the game player is aware of the game character and after it is determined that the game character is aware of the one of the virtual viewpoint and the operation subject of the game player.

Further, according to the exemplary embodiment of the present invention, the game space includes a plurality of the game characters that are disposed therein, and the game device further includes: means for determining whether or not a game character other than the game character to be subjected to action control by the action control means exists in one of a position and a region of which the game player is aware during the instruction period based on the gazing position information acquired during the instruction period and a position of the game character other than the game character to be subjected to the action control by the action control means; and means for restricting execution of the action control by the action control means when it is determined that the game character other than the game character to be subjected to the action control by the action control means exists in the one of the position and the region of which the game player is aware during the instruction period.

Further, according to the exemplary embodiment of the present invention, the game device further includes: means for determining whether or not the game character is aware of one of a position and a region within the game space of which the game player is aware during the instruction period based on the position and the sight line of the game character to be subjected to action control by the action control means and the gazing position information acquired during the instruction period; and means for restricting execution of the action control by the action control means when it is determined that the game character is not aware of the one of the position and the region within the game space of which the game player is aware during the instruction period.

Further, according to the exemplary embodiment of the present invention, the game space includes at least a first game character being the operation subject of the game player, and a second game character, that are disposed therein, the first determination means determines whether or not the game player is aware of the second game character based on the gazing position information and a position of the second game character, the second determination means determines whether or not the second game character is aware of one of the virtual viewpoint and the first game character based on a position and a sight line of the second game character and a position of the one of the virtual viewpoint and the first game character, the action control means causes the second game character to perform an action based on the change of the gazing position information during the instruction period after it is determined that the game player is aware of the second game character and after it is determined that the second game character is aware of the one of the virtual viewpoint and the first game character, and the game device further includes: means for acquiring a game parameter from means for storing the game parameter in association with a combination of a plurality of the game characters; and instruction period determination means for determining a length of the instruction period based on the game parameter associated with a combination of the first game character and the second game character.

Further, according to the exemplary embodiment of the present invention, the first determination means includes means for acquiring one of a position and a region within the game space of which the game player is aware based on the gazing position information, and the first determination means determines whether or not the game player is aware of the game character by determining whether or not the game character exists in the one of the position and the region within the game space of which the game player is aware.

Further, according to the exemplary embodiment of the present invention, the first determination means includes means for acquiring one of a position and a region within the game screen of which the game player is aware based on the gazing position information, and the first determination means determines whether or not the game player is aware of the game character by determining whether or not the game character is displayed in the one of the position and the region within the game screen of which the game player is aware.

Further, according to the exemplary embodiment of the present invention, the second determination means determines whether or not the game character is aware of the one of the virtual viewpoint and the operation subject of the game player by determining whether or not a positional relationship between a straight line that extends from the position of the game character in a sight line direction thereof and the position of the one of the virtual viewpoint and the operation subject of the game player is a predetermined positional relationship.

BRIEF DESCRIPTION OF THE DRAWINGS

In the accompanying drawings:

FIG. 12 is a diagram for illustrating a determination method performed by a first determination unit;

FIG. 16 is a flowchart illustrating the processing executed by the game device;

FIG. 17 is a diagram illustrating an example of a cooperativeness parameter.

DETAILED DESCRIPTION OF THE INVENTION

1. Embodiment

Hereinafter, detailed description is given of an example of an embodiment of the present invention with reference to the drawings. A game device according to the embodiment of the present invention is implemented by, for example, a consumer game machine (stationary game machine), a portable game machine, a cellular phone (smartphone), a personal digital assistant (PDA), or a personal computer. Herein, description is given of a case where the game device according to the embodiment of the present invention is implemented by a portable game machine.

Figure 1:
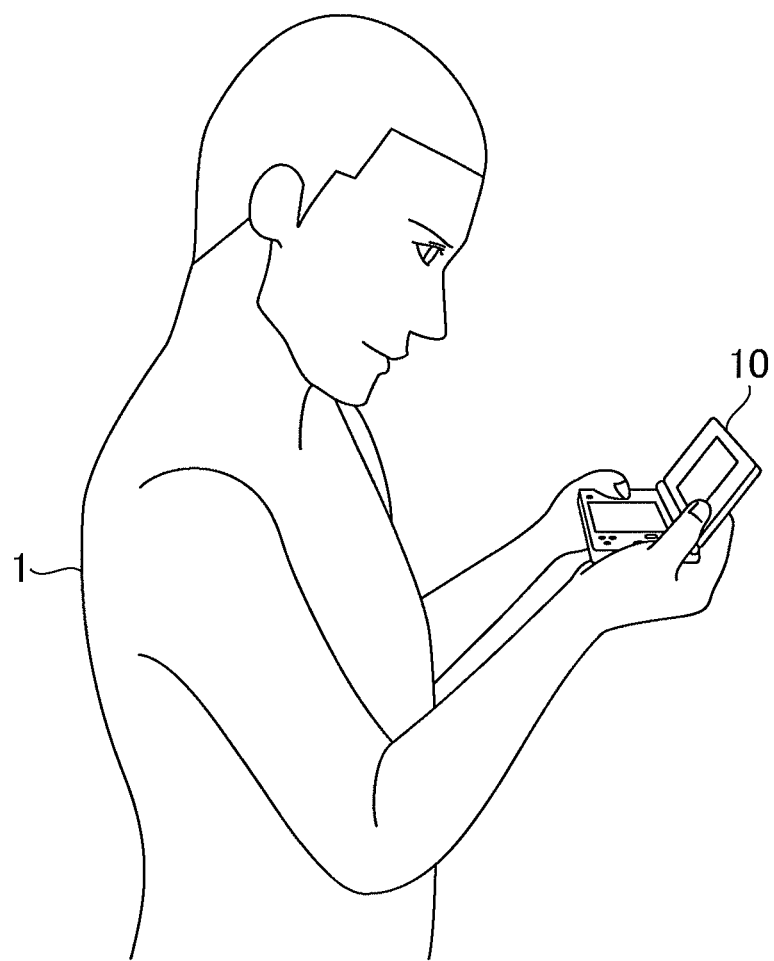
FIG. 1 is a diagram illustrating how a game player plays a game.

FIG. 1 is a diagram illustrating how a game player plays a game. As illustrated in FIG. 1, a game player 1 holds a game device 10 with both hands to play the game. As described later, the game device 10 is provided with photographing means, and the game player 1 plays the game while maintaining a posture of the game device 10 so as to include their own face within a visual field (within a photographing range) of the photographing means. Note that in the following description, the reference numeral of the game player 1 is omitted.

2. External Appearance of Game Device

Figure 2:
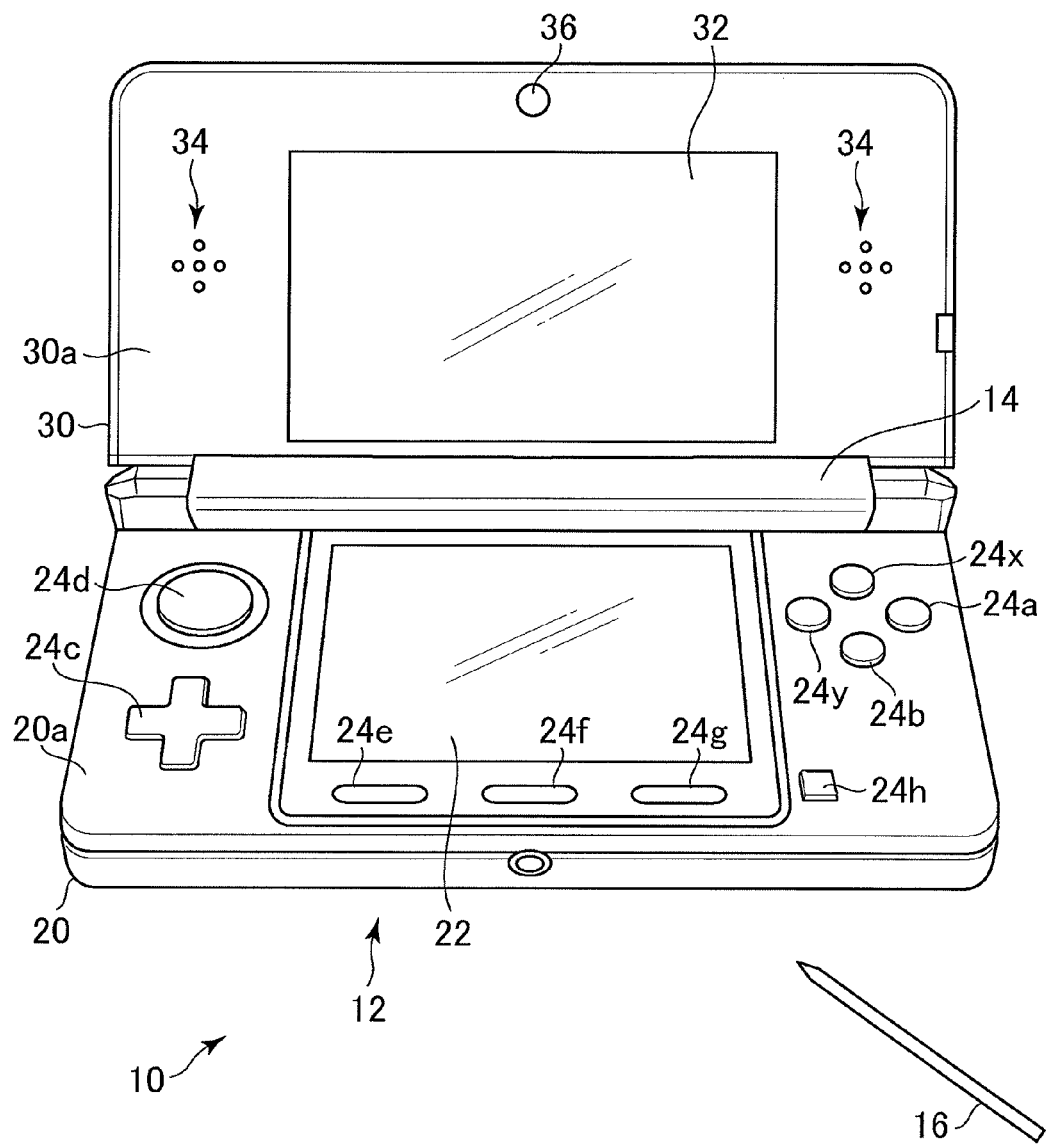
FIG. 2 is a perspective view illustrating how a game device appears when viewed from a front side thereof.

FIG. 2 is a perspective view illustrating how the game device 10 appears when viewed from a front side thereof. As illustrated in FIG. 2, the game device 10 includes a first casing 20 and a second casing 30. The first casing 20 and the second casing 30 are coupled together by a hinge unit 14.

A touch screen 22, a cross-shaped button 24*c*, a slide pad 24*d*, buttons 24*a*, 24*b*, 24*x*, 24*y*, 24*e*, 24*f*, and 24*g*, and a power button 24h are provided on a top surface 20a of the first casing 20. The touch screen 22 includes a first liquid crystal display unit 22a and a touch panel 22b (see FIG. 3). The touch panel 22b is placed over the first liquid crystal display unit 22a.

The game player uses a touch pen 16 or the like to touch a given point on the touch screen 22 (i.e., the touch panel 22b). The game player plays the game by touching the touch screen 22 with the touch pen 16 or sliding (dragging) the touch pen 16 to another position while maintaining touch contact with the touch screen 22.

The cross-shaped button 24c and the slide pad 24d are used, for example, for direction instructing operations. The cross-shaped button 24c, the slide pad 24d, and the buttons 24a, 24b, 24x, 24y, 24e, 24f, and 24g are used for various operations in the same manner as the touch pen 16 is used in the operation described above. The power button 24h is used to instruct a battery (not shown) to supply power to the components of the game device 10.

A second liquid crystal display unit 32 is provided on a surface 30a of the second casing 30. The second liquid crystal display unit 32 may be equipped with an unaided stereo vision function, for example. The second casing 30 has speakers 34 and a front-facing camera 36 as built-in components. As illustrated in FIG. 2, the front-facing camera 36 is disposed so that a sight line direction of the front-facing camera 36 is a perpendicular direction of the second liquid crystal display unit 32.

3. Hardware Construction of Game Device

Figure 3:
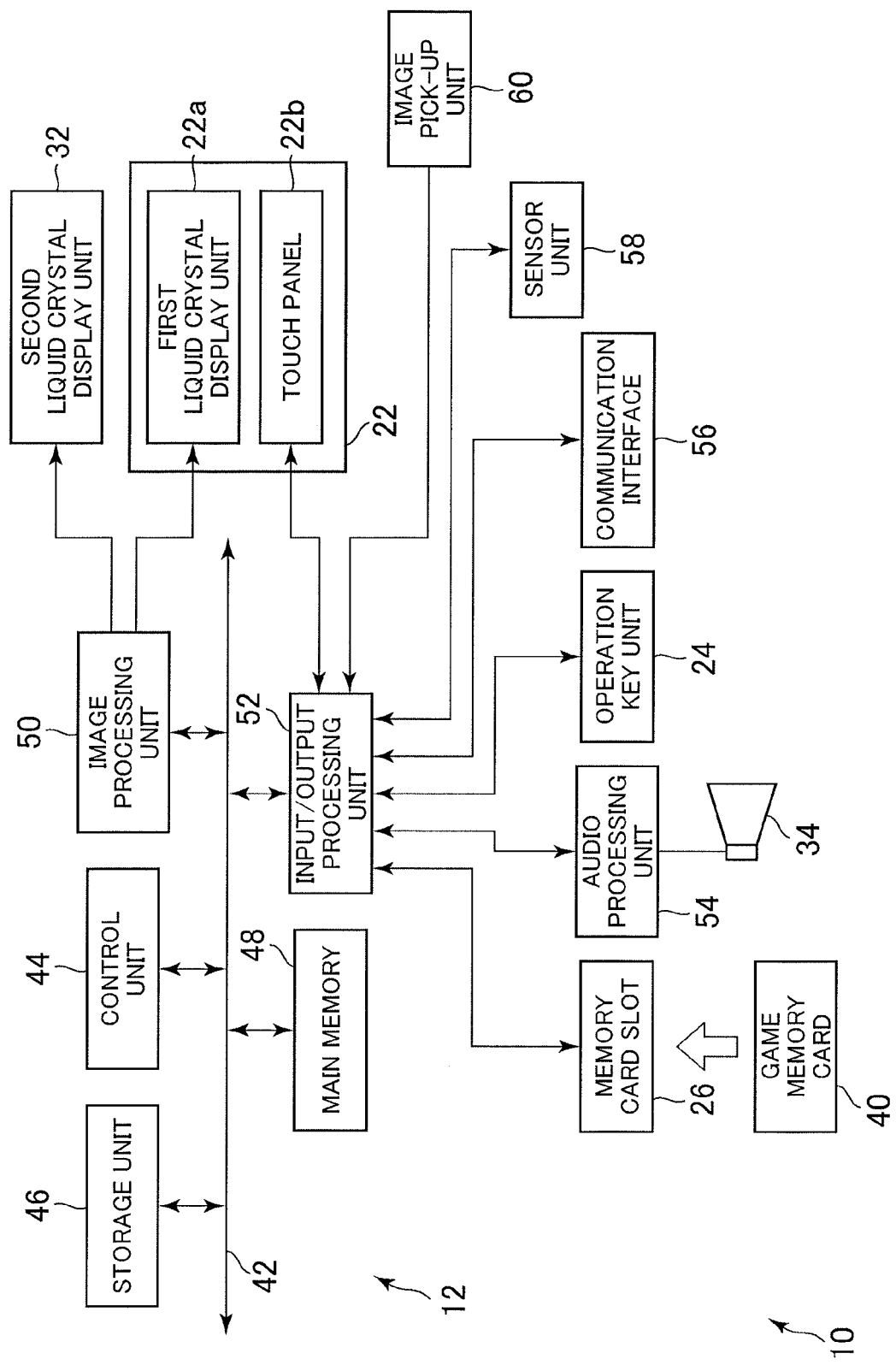
FIG. 3 is a diagram illustrating a hardware configuration of a game device according to an embodiment of the present invention.

FIG. 3 is a diagram illustrating a hardware configuration of the game device 10 according to the embodiment of the present invention. As illustrated in FIG. 3, the game device 10 includes the touch screen 22 (first liquid crystal display unit 22a and touch panel 22b), an operation key unit 24, a memory card slot 26, the second liquid crystal display unit 32, the speaker 34, a bus 42, a control unit 44, a storage unit 46, a main memory 48, an image processing unit 50, an input/output processing unit 52, an audio processing unit 54, and a communication interface 56.

The control unit 44 controls the components of the game device 10 based on an operating system which is stored in the storage unit 46, and on a program and various types of data which are stored in a game memory card 40. Further, the control unit 44 includes a real-time clock, and functions as means for measuring time.

The storage unit 46 includes a non-volatile storage medium such as a flash memory. The storage unit 46 stores an operating system and the like.

The main memory 48 includes, for example, a RAM. A program read out of the game memory card 40 via the memory card slot 26 is written into the main memory 48 as the need arises. The main memory 48 is also used as a work memory of the control unit 44.

The bus 42 is used to exchange addresses and various types of data between the components of the game device 10. The control unit 44, the main memory 48, the image processing unit 50, and the input/output processing unit 52 are connected to one another by the bus 42 in a manner that allows those components to communicate data to/from one another.

The touch screen 22 and the second liquid crystal display unit 32 include liquid crystal display panels or the like. This embodiment describes a case where the game device 10 includes two display screens, specifically, the touch screen 22 and the second liquid crystal display unit 32.

The image processing unit 50 includes a VRAM. The image processing unit 50 renders an image in the VRAM in accordance with an instruction from the control unit 44. The image rendered in the VRAM is displayed on the first liquid crystal display unit 22a and the second liquid crystal display unit 32 at a predetermined timing.

The input/output processing unit 52 is an interface by which the control unit 44 exchanges various kinds of data with the touch panel 22b, the operation key unit 24, the memory card slot 26, the audio processing unit 54, the communication interface 56, a sensor unit 58, and an image pick-up unit 60. The input/output processing unit 52 is connected to the touch panel 22b, the operation key unit 24, the memory card slot 26, the audio processing unit 54, the communication interface 56, the sensor unit 58, and the image pick-up unit 60.

The operation key unit 24 functions as input means with which the game player performs an operation. The operation key unit 24 includes the cross-shaped button 24c, the slide pad 24d, the buttons 24a, 24b, 24x, 24y, 24e, 24f, and 24g, and the power button 24h.

The input/output processing unit 52 scans the state of each part of the operation key unit 24 every predetermined cycle (e.g., every $1/60^{th}$ of a second), and supplies an operation signal representing the scanning result to the control unit 44 via the bus 42.

The touch panel 22b functions as input means in the same manner as the operation key unit 24 with which the game player performs various kinds of operations. The touch panel 22b supplies indicated position information corresponding to the indicated position on the first liquid crystal display unit 22a indicated by the game player or by an object (touch pen 16) that the game player grasps to the control unit 44 via the input/output processing unit 52.

The memory card slot 26 reads a game program and game data stored in the game memory card 40 in accordance with an instruction issued from the control unit 44. The game memory card 40 includes, for example, a ROM in which the game program and the game data such as image data are stored and an EEPROM in which the game data such as save data is stored.

Note that in this embodiment, the description is given by taking an example in which the game memory card 40 is used in order to supply the game program and the game data to the game device 10, but another information storage medium such as an optical disc may be used. In addition, the game program and the game data may be supplied to the game device 10 from a remote site via a communication network such as the Internet. Alternatively, various data communications such as infrared communications may be used to supply the game program and the game data to the game device 10.

The audio processing unit 54 includes a sound buffer. The audio processing unit 54 outputs a music track or audio from the speaker 34 based on data for output of the music track or audio data stored in the sound buffer. The communication interface 56 is an interface for connecting the game device 10 to the communication network.

The sensor unit 58 includes a gyroscope, a motion sensor, and the like, and detects the posture of the game device 10.

The image pick-up unit 60 includes the front-facing camera 36, a back-facing camera (not shown), and the like, and generates a picked-up image. The image pick-up unit 60 photographs a face of the game player. The control unit 44 identifies a sight line and a fixation point of the game player based on a photographed image obtained by photographing the face of the game player. In this case, an auto-focus function of the front-facing camera 36 is used to generate the photographed image with the position of the face of the game player in focus.

Figure 4:
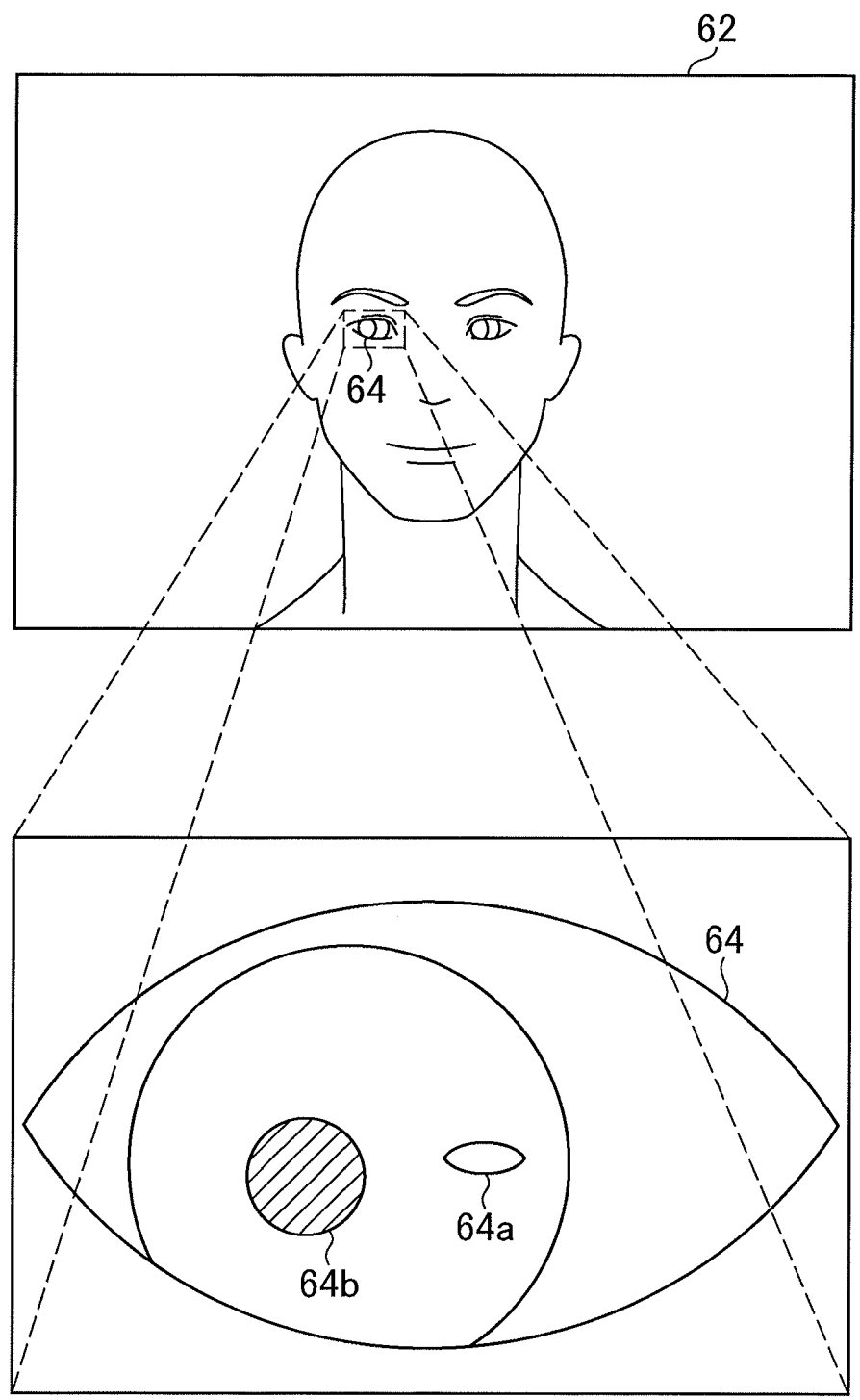
FIG. 4 is a diagram illustrating a photographed image photographed by an image pick-up unit.

FIG. 4 is a diagram illustrating the photographed image photographed by the image pick-up unit 60. As illustrated in FIG. 4, a photographed image 62 includes the face of the game player. In this case, the description is given by taking as an example a method of detecting the fixation point of the game player by using a corneal reflex method for measuring an eye movement based on positions of corneal reflex images (Purkinje images) that appear brightly when a cornea (iris and pupil) of the game player is illuminated.

Note that the method of detecting the fixation point of the game player is not limited to the corneal reflex method, and the fixation point of the game player may be detected by various known methods. In addition, for example, a scleral reflex method (Limbus tracking method) of measuring the eye movement by using a difference in reflectivity between the cornea (iris and pupil) and a sclera (white of an eye) may be used.

In this embodiment, first, an eye image 64 indicating the eye of the game player photographed in the photographed image 62 is identified. For example, a comparison image (instructor image) indicating an eye is prepared, and pattern matching is performed on the comparison image and the photographed image 62, to thereby identify the eye image 64. In addition, the eye image 64 may be identified by extracting an outline of the eye based on a difference in pixel value between the white of the eye and an eyelid of the game player.

Subsequently, a reflex image 64a of a light source (center point of a light source reflex image) on a surface of the cornea of the eye and a pupil 64b (center point of a pupil) are identified from the eye image 64. The reflex image 64a and the pupil 64b may also be identified by pattern matching processing with respect to the comparison image or based on the difference in pixel value from surrounding pixels. Then, a center position of the pupil 64b of the game player and a sight line direction thereof within a three-dimensional space coordinate system defined in a real space (hereinafter, referred to as "real space coordinate system") are identified based on a positional relationship between the reflex image 64a and the pupil 64b.

Figure 5:
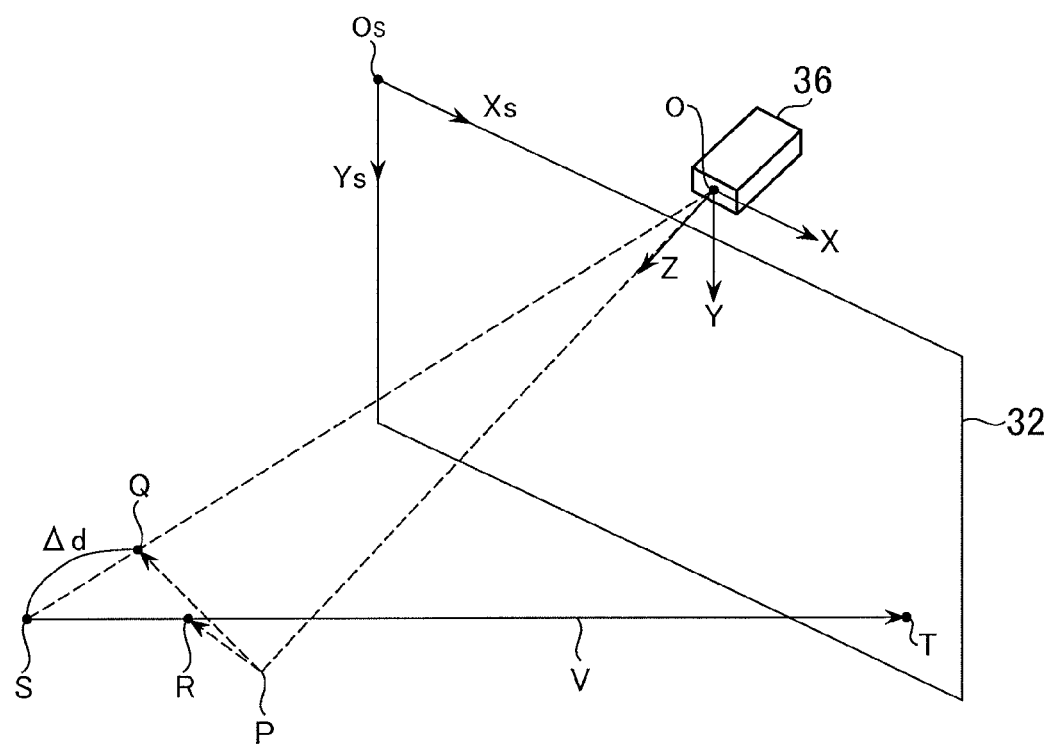
FIG. 5 is a diagram for illustrating a method of calculating a center position of a pupil of the game player and a sight line vector thereof within a real space coordinate system.

FIG. 5 is a diagram for illustrating a method of calculating the center position of the pupil of the game player and a sight line vector thereof within the real space coordinate system. As illustrated in FIG. 5, the real space coordinate system is a coordinate system in which a reference position within the real space is set as an origin of the coordinate system and three directions orthogonal to one another are set as three axes of the coordinate system. In this case, the real space coordinate system is set so that the position of the front-facing camera 36 is an origin O, a horizontal direction is an X-axis, a perpendicular direction is a Y-axis, and the sight line direction of the front-facing camera 36 is a Z-axis.

As illustrated in FIG. 5, a point spaced apart from the origin O in a Z-axis direction by a focus distance of the front-facing camera 36 is set as a focus position P. The focus distance is defined based on the focus set in the front-facing camera 36 at a time of photographing the photographed image 62. For example, an object existing around the focus position P (in the photographed image 62 of FIG. 4, around the center of the face of the game player) appears around the center of the photographed image 62.

In this case, a position Q spaced apart from the focus position P by a vector that extends from the center point of the photographed image 62 toward a position of the reflex image 64a is set as the position of the reflex image 64a within the real space coordinate system. In the same manner, a position R spaced apart from the focus position P by a vector that extends from the center point of the photographed image 62 toward a position of the pupil 64b is set as the center position of the pupil within the real space coordinate system.

Then, a position spaced apart from the position Q in a direction connecting the origin O and the position Q of the reflex image 64a by a predetermined distance $\Delta d$ ($\Delta d$ is a predetermined distance corresponding to a radius of a typical eyeball of a human (for example, 12 mm)) is set as a center point S of the eyeball of the game player. A direction from the center point S toward the position R being the center point of the pupil is a sight line direction V of the game player.

Further, coordinate information indicating the position within a screen region of the second liquid crystal display unit 32 within the real space coordinate system is stored in advance, and a position in which a straight line extending from the position R of the center of the pupil calculated as described above in the sight line direction V (that is, sight line of the game player) intersects the screen region is detected as a fixation point T of the game player. In this case, the fixation point T of the game player is generated as two-dimensional coordinates within a screen coordinate system (coordinate system in which a top left end point of the second liquid crystal display unit 32 is set as an origin Os, a long-side direction of the screen is set as an Xs-axis, and a short-side direction of the screen is set as a Ys-axis).

4. Game Executed by the Game Device

The game device 10 executes the game program read from the game memory card 40, to thereby execute a game configured so that a game character moves within a game space. In this embodiment, a soccer game configured so that a plurality of player characters move within the game space that imitates a venue for a soccer match performed by using a ball is executed.

In the soccer game, a soccer match is played between a first team operated by the game player (hereinafter, referred to as "game player team") and a second team operated by an opponent (computer or another game player) (hereinafter, referred to as "opponent team"). When the soccer game is started, the game space is built in the main memory 48.

Figure 6:
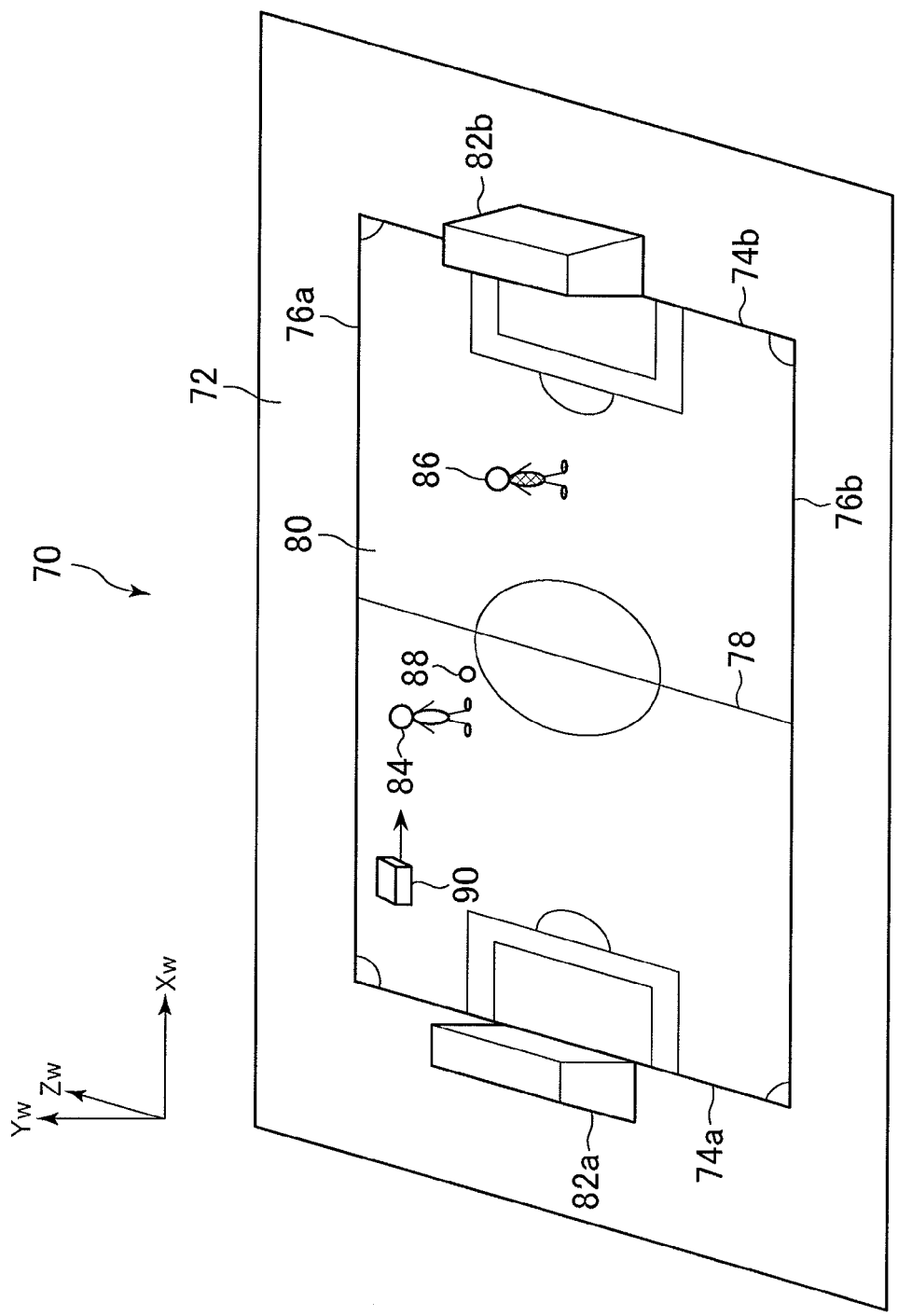
FIG. 6 is a diagram illustrating an example of a game space.

FIG. 6 is a diagram illustrating an example of the game space. A game space 70 illustrated in FIG. 6 is a virtual three-dimensional space in which three axes of coordinates (Xw-axis, Yw-axis, and Zw-axis) orthogonal to one another are set. As illustrated in FIG. 6, in the game space 70, there is disposed a field 72, which is an object representing a soccer field.

Displayed on the field 72 are two goal lines 74a and 74b, two touchlines 76a and 76b, and a center line 78. A match is played within a pitch 80 surrounded by the two goal lines 74a and 74b and the two touchlines 76a and 76b, and around the pitch 80 (predetermined region which is outside the pitch 80 and is in contact with the goal lines 74a or 74b or the touchlines 76a or 76b).

Further, goals 82a and 82b that are objects representing goals for soccer, a player character 84 that is an object representing a soccer player belonging to the game player team, a player character 86 that is an object representing a soccer player belonging to the opponent team, and a ball 88 that is an object representing a soccer ball (moving object) are disposed on the field 72. The positions of the respective objects are identified by, for example, three-dimensional coordinates within a world coordinate system (Xw-Yw-Zw coordinate system).

Note that 11 player characters 84 belonging to the game player team and 11 player characters 86 belonging to the opponent team are disposed on the field 72, but are omitted in FIG. 6.

When the player character 84 (86) and the ball 88 come close to each other, the player character 84 (86) and the ball 88 become associated with each other under a predetermined condition. In this case, the moving action of the player character 84 (86) becomes a dribbling action. The state in which the ball 88 is associated with the player character 84 (86) is hereinafter referred to as a state in which "the player character 84 (86) is keeping the ball 88".

Further, in the game space 70, a given virtual camera 90 (viewpoint) is set. For example, the position of the virtual camera 90 is determined based on the position of a tracking target within the game space 70. The tracking target is an object to be included within the visual field of the virtual camera 90, and is, for example, the ball 88. The position of the virtual camera 90 maintains a predetermined positional relationship with the tracking target. For example, the position of the virtual camera 90 is a position spaced apart from the position of the tracking target in a predetermined direction by a predetermined distance.

The sight line direction of the virtual camera 90 is determined based on a reference direction set within the game space 70 or on a representative direction of the tracking target. The reference direction is a direction determined in advance, and is, for example, a direction from one object within the game space 70 (for example, goal 82a associated with the game player team) toward another object (for example, goal 82b associated with the opponent team). The representative direction of the tracking target is a direction associated with the tracking target, and is, for example, a moving direction of the tracking target.

In this case, a position spaced apart from the position of the ball 88 in the predetermined direction by a predetermined distance is the position of the virtual camera 90. Further, a direction from the goal 82a toward the goal 82b (direction from the position of the game player team toward the position of the opponent team) is the sight line direction of the virtual camera 90.

A game screen showing how the game space 70 is viewed from the virtual camera 90 is displayed on the second liquid crystal display unit 32. The game screen is generated by using a predetermined coordinate conversion operation to convert coordinates of vertices of the respective objects disposed in the game space 70 from the world coordinate system into the screen coordinate system.

Figure 7:
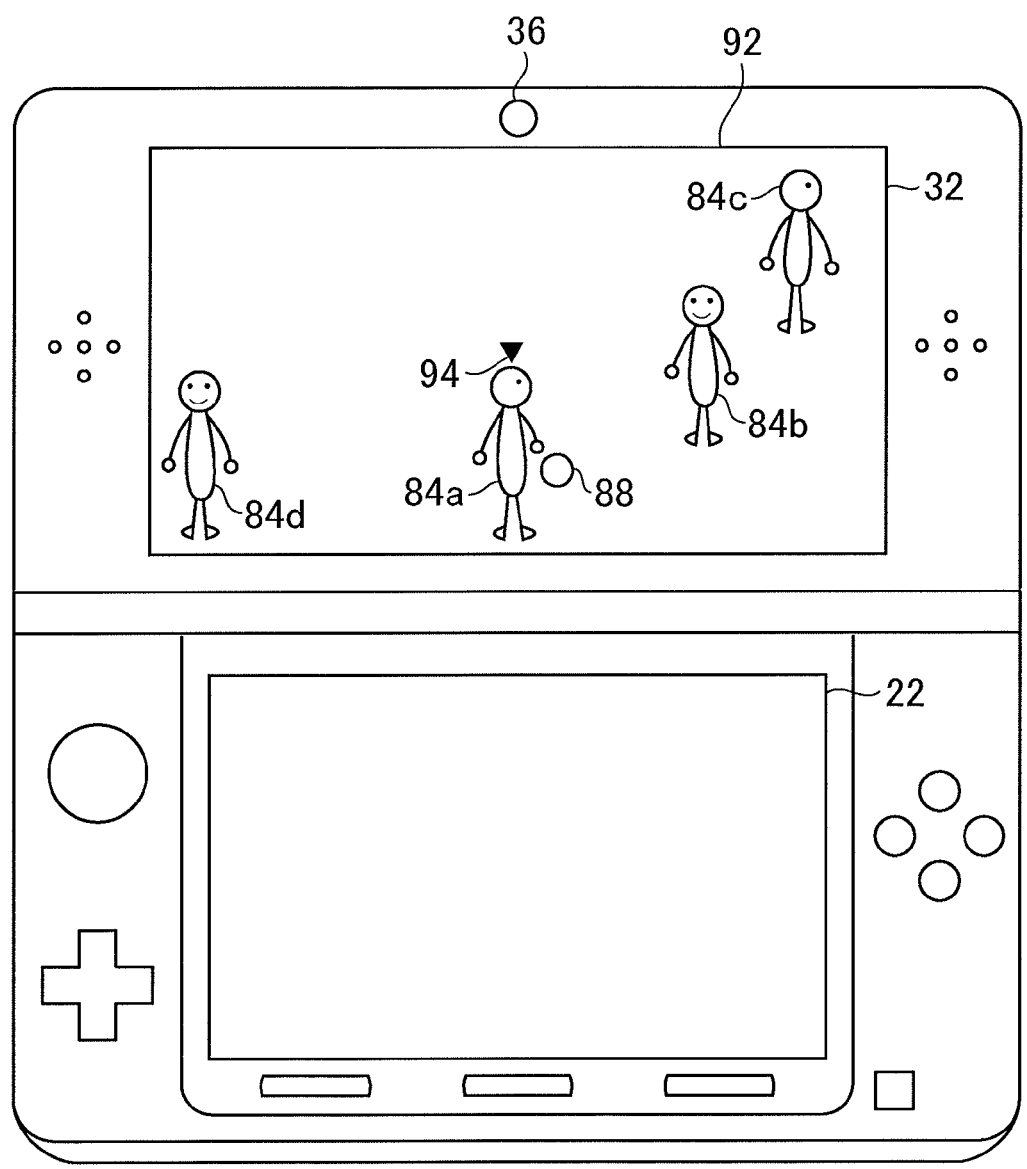
FIG. 7 is a diagram illustrating an example of a game screen.

FIG. 7 is a diagram illustrating an example of the game screen. A game screen 92 illustrated in FIG. 7 includes four player characters 84a, 84b, 84c, and 84d belonging to the game player team and the ball 88. In FIG. 7, for example, the player character 84a keeping the ball 88 is set as an operation subject of the game player. A cursor 94 indicating that the player character 84a is set as the operation subject of the game player is displayed above a head of the player character 84a. The player character 84a behaves based on a game operation performed by the game player. For example, when the game player performs a direction instruction operation through the operation key unit 24, the player character 84a performs dribbling in an instructed direction.

On the other hand, the player character 84 (86) that is not set as the operation subject behaves based on an operation performed by the computer. The player character 84 (86) operated by the computer autonomously behaves in accordance with a predetermined behavior algorithm. In the case of a situation illustrated in FIG. 7, the player characters 84b, 84c, and 84d other than the player character 84a behave based on the operation performed by the computer.

In the game device 10 according to this embodiment, in a case where the player character 84 existing in the direction of the sight line of the game player is also looking in the direction of the game player, the player character 84 moves in a direction in which the sight line of the game player moves. That is, after the game player makes eye contact with the player character 84 displayed on the game screen 92, the player character 84 moves in a direction in which the game player looks after making eye contact.

Figure 8:
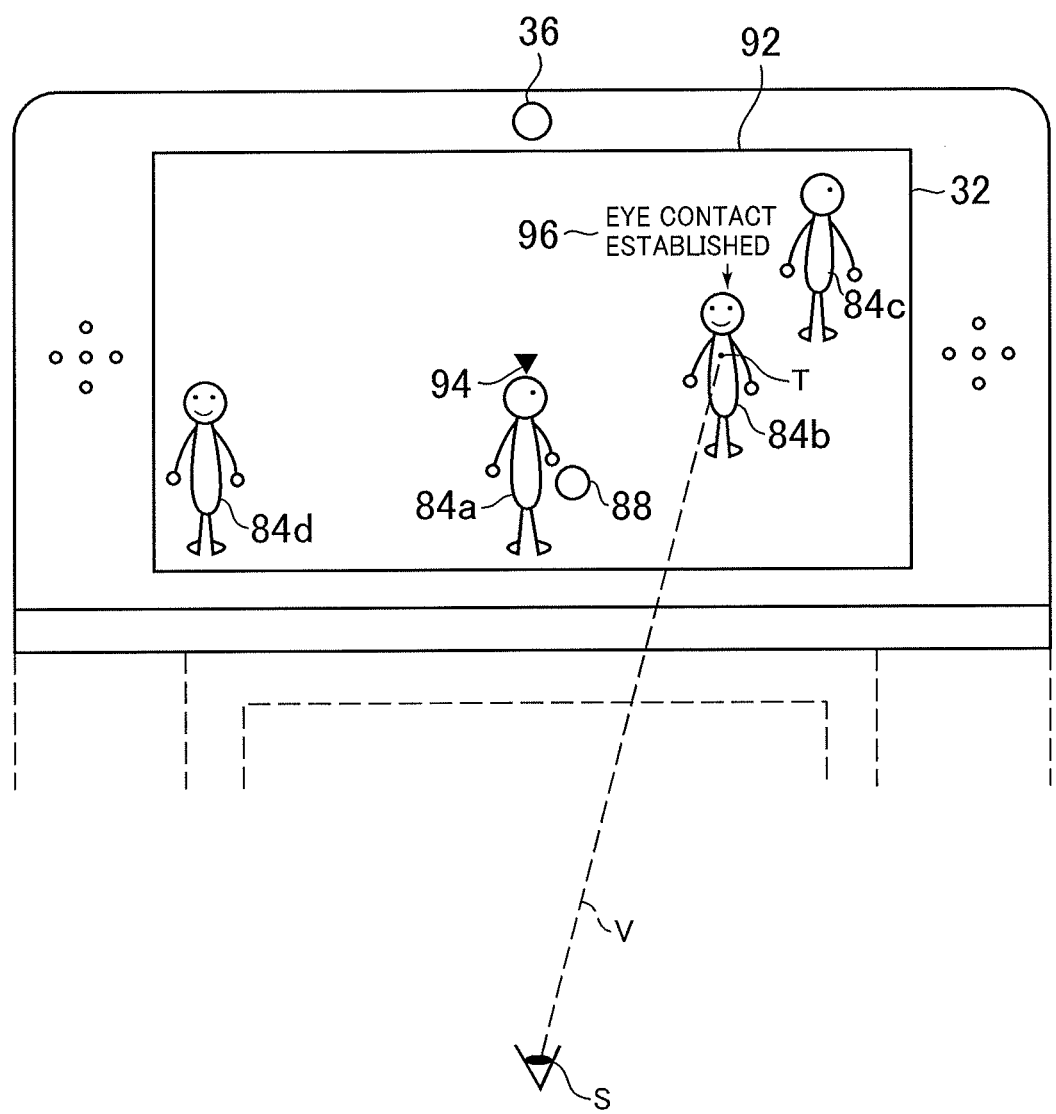
FIG. 8 is a diagram illustrating how the game player makes eye contact.

FIG. 8 is a diagram illustrating how the game player makes eye contact. As illustrated in FIG. 8, the player character 84b is displayed at the fixation point T on the game screen 92 in the sight line direction V of the game player extending from the center point S of the eye of the game player. The player character 84b is aware of the direction of the game player (in actuality, the player character 84b is oriented toward the virtual camera 90).

That is, in a situation illustrated in FIG. 8, the game player and the player character 84b are making eye contact with each other. For example, after the game player and the player character 84b have kept staring at each other for a reference period (for example, one second), a message 96 indicating that the eye contact has been established is displayed on the game screen 92. Note that there is a fear that the sight line of the game player may move to a given position when the message 96 is displayed in the given position spaced apart from the player character 84b, and hence, as illustrated in FIG. 8, the message 96 is displayed at a position within a predetermined distance from the player character 84b with which the eye contact has been established.

The displaying of the message 96 allows the game player to grasp that the eye contact with the player character 84b has been established. After that, the game player can issue an instruction to the player character 84b by using the sight line. For example, when the game player moves the sight line in a given direction in which the player character 84b is to be moved, the player character 84b moves in the given direction.

Figure 9:
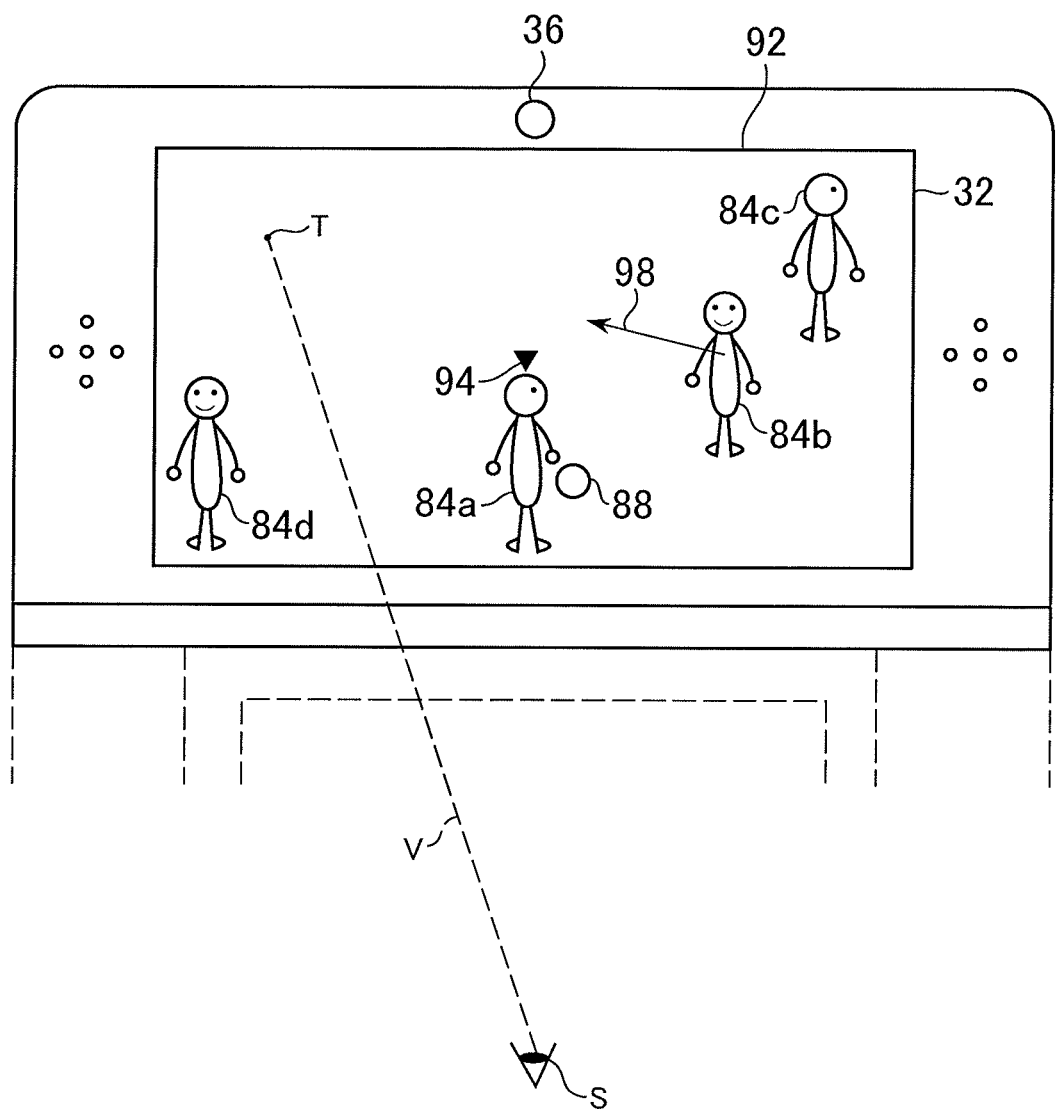
FIG. 9 is a diagram illustrating how the game player issues an instruction to a player character by moving their eye.

FIG. 9 is a diagram illustrating how the game player issues an instruction to the player character 84b by moving their eye. As illustrated in FIG. 9, after the game player moves the sight line leftward to move the fixation point T to a left side of the game screen 92, the player character 84b with which the eye contact has been established moves leftward when viewed from the game player. In other words, the player character 84b starts moving in a direction of an arrow 98 that connects the player character 84b and the fixation point T.

In this manner, the game device 10 can issue an instruction to the player character 84 by moving their eye of the game player even without using the operation key unit 24. Hereinafter, the above-mentioned technology is described in detail.

5. Functions Implemented by the Game Device

Figures 10, 11:
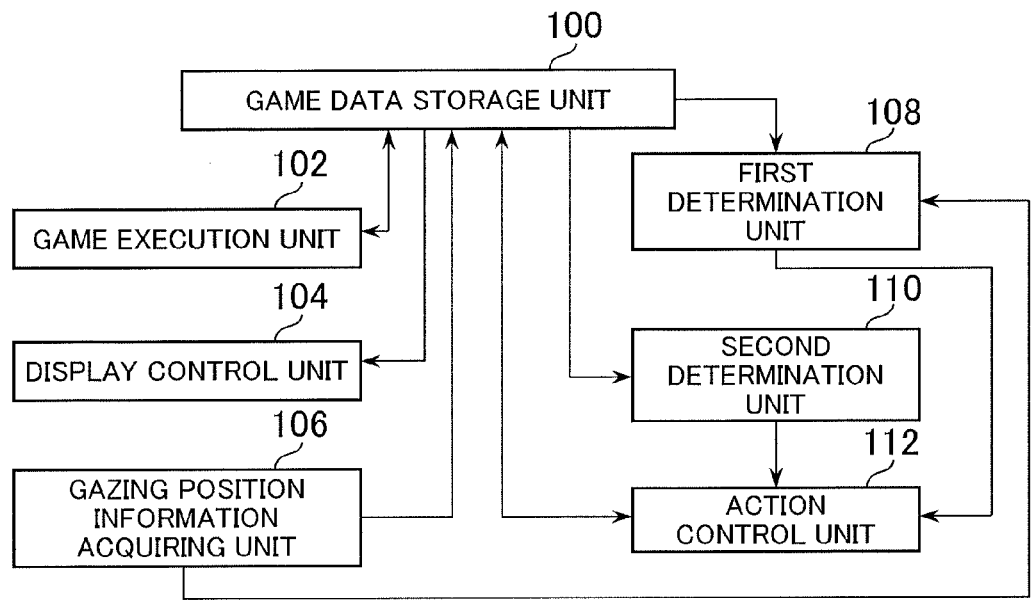
FIG. 10 is a functional block diagram illustrating functions relating to the present invention among functions implemented by the game device.
FIG. 11 is a diagram illustrating data storage example of gazing position history data.

FIG. 10 is a functional block diagram illustrating functions relating to the present invention among functions implemented by the game device 10. As illustrated in FIG. 10, the game device 10 executes the game program, to thereby implement a game data storage unit 100, a game execution unit 102, a display control unit 104, a gazing position information acquiring unit 106, a first determination unit 108, a second determination unit 110, and an action control unit 112.

(5-1. Game Data Storage Unit)

The game data storage unit 100 is implemented mainly by, for example, the main memory 48, the game memory card 40, and the like. The game data storage unit 100 stores, for example, data necessary to run a soccer game. For example, the game data storage unit 100 stores game situation data and gazing position history data indicating a history of gazing position information acquired by the gazing position information acquiring unit 106.

(Game Situation Data)

The game situation data is data indicating the current situation of the game being executed. For example, the game situation data includes such information as described below. The game situation data is updated every predetermined time so as to correspond to progress of the game. Specifically, examples of the game situation data include: (1) information indicating the player character 84 set as the operation subject of the game player; (2) information indicating the current state (position, sight line direction, posture, moving direction, and moving speed) of the player character 84 (86); (3) information indicating the current state (position, moving direction, moving speed, and the like) of the ball 88; (4) information indicating the player character 84 (86) keeping the ball 88; (5) information indicating the current state (position, sight line direction, and the like) of the virtual camera 90; and (6) information indicating other current game situation (for example, scores of both teams and elapsed time).

The game situation data includes, as described above, information relating to the position of the player character 84 (86) and the sight line. In this case, the sight line direction of the player character 84 (86) is used as information relating to the sight line of the player character 84 (86). In addition, for example, information indicating the region itself of the visual field of the player character 84 (86) or the representative direction (orientation of a face or orientation of a body) of the player character 84 (86) may be used as the information relating to the sight line of the player character 84 (86).

(Gazing Position History Data)

FIG. 11 is a diagram illustrating data storage example of the gazing position history data. As illustrated in FIG. 11, information indicating the two-dimensional coordinates of the fixation point within the screen coordinate system is stored in association with an acquisition time at which the information is acquired. Each time the gazing position information acquiring unit 106 acquires the gazing position information, a new record is stored in the gazing position history data.

(5-2. Game Execution Unit)

The game execution unit 102 is implemented mainly by, for example, the control unit 44. The game execution unit 102 executes a game configured so that the player character 84 (86) moves within the game space 70. In this case, a plurality of player characters 84 (86) are disposed in the game space 70, and any one of the plurality of player characters 84 (86) is set as the operation subject of the game player. At least a first game character (for example, player character 84a) being the operation subject of the game player and a second game character (for example, player character 84b) are disposed in the game space 70.

The game execution unit 102 determines, for example, the player character 84 set as the operation subject of the game player and an action of the player character 84 (86) operated by the computer. Further, the game execution unit 102 updates the game situation data so as to correspond to the progress of the game. For example, the game execution unit 102 updates the game situation data based on the behavior of the player character 84 (86) operated by the computer and the behavior of the operation subject of the game player which is determined by the action control unit 112.

(5-3. Display Control Unit)

The display control unit 104 is implemented mainly by, for example, the second liquid crystal display unit 32 and the control unit 44. The display control unit 104 causes display means (for example, second liquid crystal display unit 32) to display the game screen 92 indicating how the game space 70 appears when viewed from a given virtual viewpoint (for example, virtual camera 90). The game screen 92 is generated by subjecting the vertices of the objects included in the visual field, which is defined based on the position of the virtual camera 90 and the sight line direction thereof, to coordinate conversion processing for conversion from the world coordinate system into the screen coordinate system.

(5-4. Gazing Position Information Acquisition Unit)

The gazing position information acquiring unit 106 is implemented mainly by, for example, the image pick-up unit 60 and the control unit 44. The gazing position information acquiring unit 106 acquires the gazing position information relating to a position on which the game player is fixing their eye within the game screen 92 based on an image (for example, photographed image 62) obtained by the photographing means (for example, image pick-up unit 60) for photographing the face of the game player. The gazing position information is information indicating the fixation point of the game player or information indicating a region (region including the fixation point of the game player) on which the game player is fixing their eye.

The gazing position information acquiring unit 106 extracts a feature point from the photographed image 62, to thereby acquire the gazing position information. The feature point is the position of a distinctive part of the image indicating the eye of the game player, and is extracted by, for example, pattern matching with respect to the comparison image indicating the above-mentioned part. The position of the cornea (iris and pupil) of the game player, the position of the sclera (white of the eye), or the position of a reflex image is extracted as the feature point. For example, the gazing position information acquiring unit 106 extracts a plurality of feature points from the photographed image 62, and acquires the gazing position information based on the positional relationship among the plurality of feature points.

In this case, the description is directed to a case where the gazing position information acquiring unit 106 acquires the gazing position information from the photographed image 62 based on the corneal reflex method. For example, the gazing position information acquiring unit 106 extracts the eye image 64 indicating the eye of the game player from the photographed image 62. For example, the eye image 64 is extracted by performing the pattern matching between the photographed image 62 and the comparison image. Then, the gazing position information acquiring unit 106 acquires the gazing position information based on the eye image 64.

For example, the gazing position information acquiring unit 106 identifies the positions of the reflex image 64a and the pupil 64b that are included in the eye image 64. The positions of the reflex image 64a and the pupil 64b that are included in the eye image 64 are also identified by performing the pattern matching. Then, the gazing position information acquiring unit 106 acquires the fixation point of the game player based on the positional relationship between the reflex image 64a and the pupil 64b that are included in the eye image 64.

Specifically, the gazing position information acquiring unit 106 identifies the position of the pupil of the game player and the sight line direction thereof within the real space coordinate system based on the positional relationship between the reflex image 64a and the pupil 64b within the photographed image 62. For example, the sight line direction of the game player is acquired based on the positional relationship between the position of the reflex image and the position of the pupil within the real space coordinate system, which are identified based on information relating to the focus at the time of photographing the photographed image 62 and on the reflex image 64a and the pupil 64b within the photographed image 62. In addition, the fixation point of the game player is acquired based on the position of the pupil and the sight line direction of the game player within the real space coordinate system. For example, a intersection point between the straight line extending from the position of the pupil in the sight line direction of the game player and the screen region of the second liquid crystal display unit 32 set in advance within the real space coordinate system is acquired as the fixation point of the game player.

(5-5. First Determination Unit)

The first determination unit 108 is implemented mainly by, for example, the control unit 44. The first determination unit 108 determines whether or not the game player is aware of the game character based on the gazing position information and the position of the game character (for example, player character 84b being the second game character). The term "being aware of" as used herein represents sensing a subject, and its meaning includes looking at the subject. That is, the meaning of "A being aware of B" includes "A looking at B".

For example, by determining whether or not the position indicated by the gazing position information and the position of the player character 84 have a predetermined positional relationship, it is determined whether or not the game player is aware of the player character 84.

In this case, the first determination unit 108 includes means for acquiring a position or a region of which the game player is aware within the game space 70 based on the gazing position information, and determines whether or not the game player is aware of the player character by determining whether or not the game character (for example, player character 84b being the second game character) exists in the position or the region.

FIG. 12 is a diagram for illustrating a determination method performed by the first determination unit 108. The position of which the game player is aware within the game space 70 is a determination target position U within the game space 70 obtained by subjecting the two-dimensional coordinates of the fixation point T indicated by the gazing position information to the coordinate conversion processing. For example, a Z-value (depth information) on a pixel existing in the fixation point T of the game player is referred to, and screen coordinates indicating the position of the pixel are converted into world coordinates, to thereby identify the three-dimensional coordinates of the determination target position U within the game space 70.

Note that, the Z-value is calculated when the game screen 92 is generated. That is, in this case, inverse conversion to the coordinate conversion processing performed when the game screen 92 is generated from the game space 70 is performed. The first determination unit 108 refers to the game situation data, to thereby determine whether or not the player character 84 belonging to the game player team exists within a predetermined distance from the determination target position U.

(5-6. Second Determination Unit)

The second determination unit 110 is implemented mainly by, for example, the control unit 44. The second determination unit 110 determines whether or not the game character is aware of the virtual viewpoint or the operation subject of the game player based on the position and the sight line of the game character (for example, player character 84b being the second game character) and the position of the virtual viewpoint (for example, virtual camera 90) or the operation subject of the game player (for example, player character 84a being the first game character).

In this case, the second determination unit 110 determines whether or not the positional relationship between the straight line extending from the position of the game character (for example, player character 84 (86)) in the sight line direction and the position of the virtual viewpoint (for example, virtual camera 90) or the operation subject of the game player is a predetermined positional relationship, to thereby determine whether or not the game character is aware of the virtual viewpoint or the operation subject of the game player.

The term "predetermined positional relationship" as used herein represents: a positional relationship in which a distance between the above-mentioned straight line and the position of the virtual camera 90 or the operation subject of the game player is within a reference distance; a positional relationship in which an angle formed between the above-mentioned straight line and a straight line that connects the position of the player character 84 and the position of the virtual camera 90 or the operation subject of the game player is within a reference angle; or a positional relationship in which the above-mentioned straight line passes through a region set based on the position of the virtual camera 90 or the operation subject of the game player.

Figure 13:
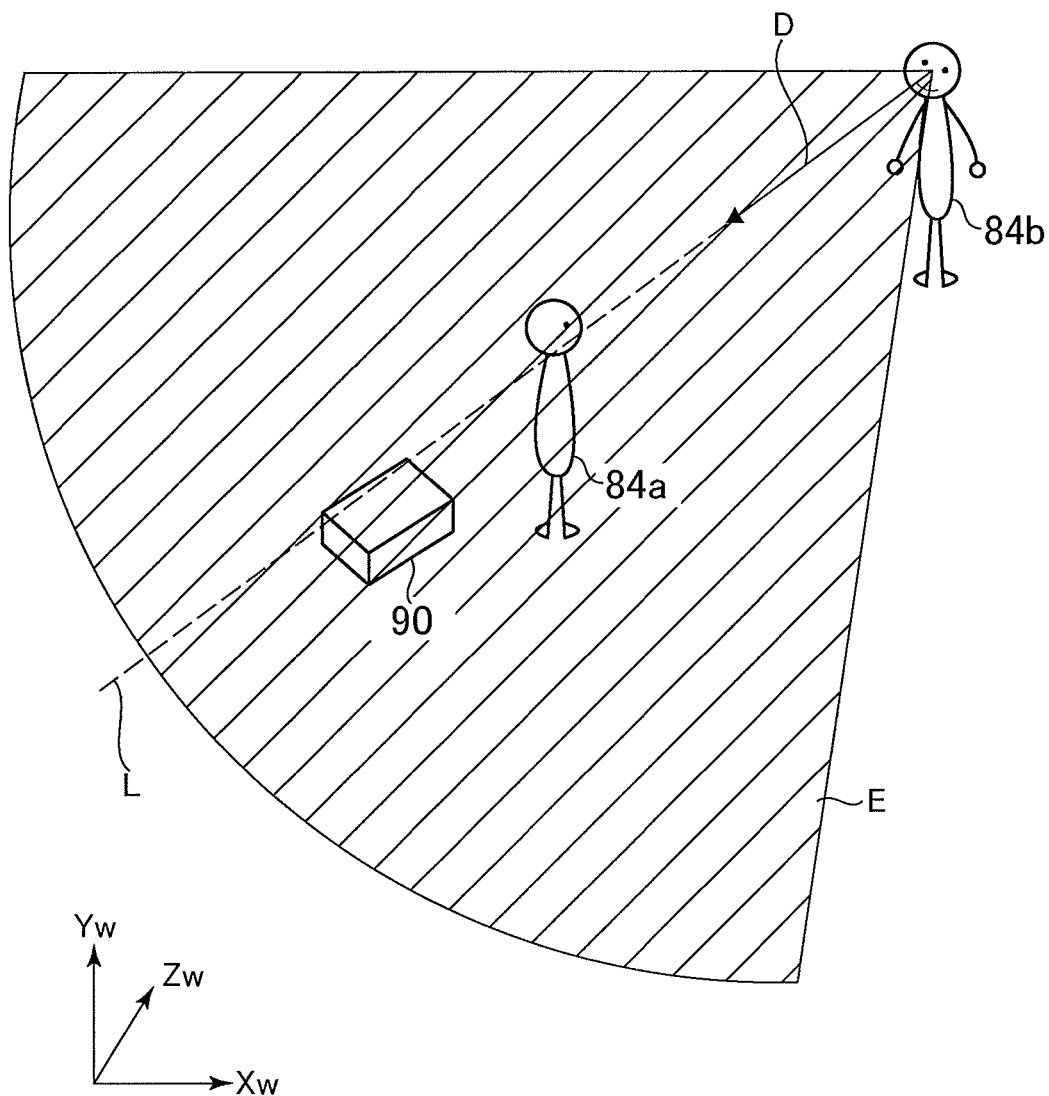
FIG. 13 is a diagram for illustrating a determination method performed by a second determination unit.

FIG. 13 is a diagram for illustrating a determination method performed by the second determination unit 110. As illustrated in FIG. 13, a visual field E of the player character 84b is determined based on the position of the player character 84b and a sight line direction D thereof. The second determination unit 110 determines whether or not a distance between a straight line L that extends from the position of the player character 84 (86) in the sight line direction D and the virtual camera 90 or the operation subject of the game player (for example, player character 84a) is within a reference distance.

(5-7. Action Control Unit)

The action control unit 112 is implemented mainly by, for example, the control unit 44. The action control unit 112 causes the game character (for example, player character 84b being the second game character) to perform an action corresponding to the gazing position information or a predetermined action based on determination results obtained by the first determination unit 108 and the second determination unit 110.

For example, when it is determined that the game player is aware of the game character (for example, player character 84b being the second game character) and when it is determined that the game character is aware of the virtual viewpoint (for example, virtual camera 90) or the operation subject of the game player (for example, player character 84a being the first game character), the action control unit 112 causes the game character to perform the action corresponding to the gazing position information or the predetermined action.

In this embodiment, the action control unit 112 includes means for determining whether or not a state in which it is determined that the game player is aware of the game character (for example, player character 84b being the second game character) and in which it is determined that the game character is aware of the virtual viewpoint (for example, virtual camera 90) or the operation subject of the game player (for example, player character 84a being the first game character) has continued for a reference period. When the above-mentioned state is determined to have continued for the reference period, the action control unit 112 causes the player character 84 to perform the action corresponding to the gazing position information or the predetermined action. That is, when the above-mentioned state is not determined to have continued for the reference period, a restriction is imposed so as to inhibit the game player from issuing an instruction to the player character 84 by using the sight line.

Further, in this case, the action control unit 112 causes the player character 84 to perform an action based on a change of the fixation point of the game player during an instruction period after the above-mentioned determination has been performed. The instruction period is, for example, a period after the message 96 for informing the game player that the eye contact has been established is displayed and a period from a predetermined period before a current time point until the current time point.

Figure 14:
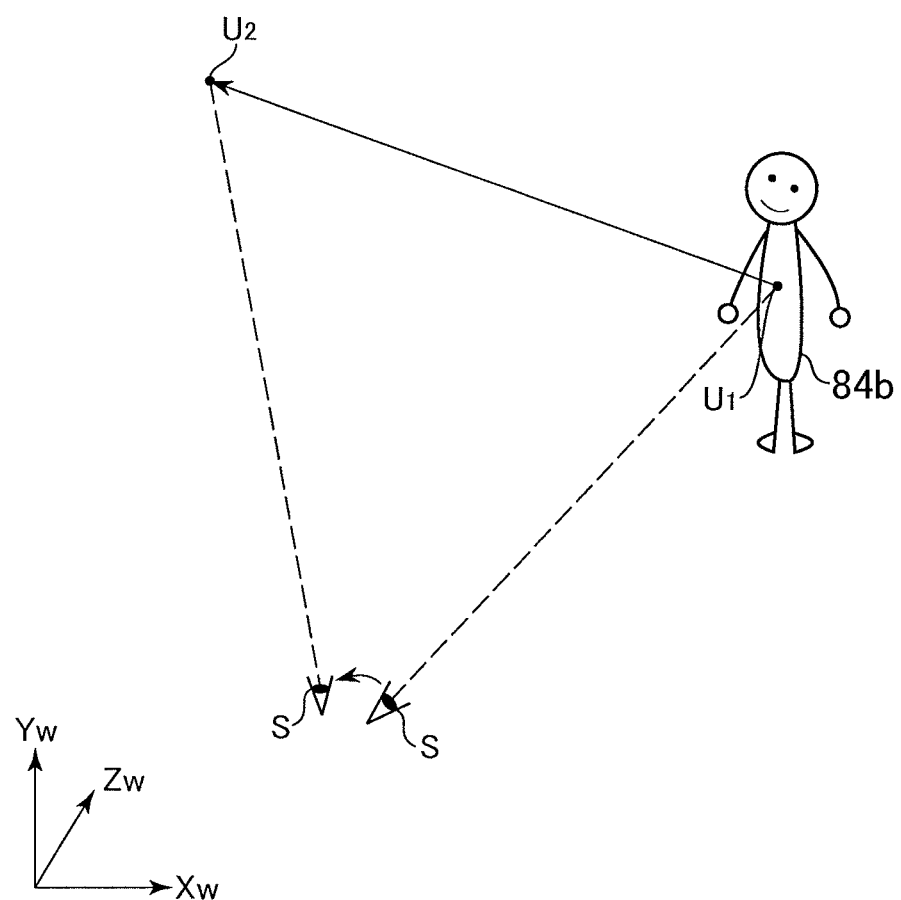
FIG. 14 is a diagram illustrating how the player character performs an action based on a change of a fixation point.

FIG. 14 is a diagram illustrating how the player character 84 performs an action based on a change of the fixation point. As illustrated in FIG. 14, it is assumed that the sight line of the game player changes during the instruction period and a place of which the game player is aware has changed from a determination target position $U_1$ to a determination target position $U_2$. In this case, the player character 84b with which the eye contact has been established moves toward the determination target position $U_2$. That is, the game player instructs the player character 84b to move to a position in a moving destination thereof by using the sight line.

Note that in a case where the action control unit 112 causes the player character 84 with which the eye contact has been established to perform the predetermined action, an action of a given type, among types of action that can be performed by the player character 84 in the game, is performed. For example, an action of a type designated by the game player in advance (for example, running in a predetermined direction) may be performed.

6. Processing Executed by the Game Device

Figure 15:
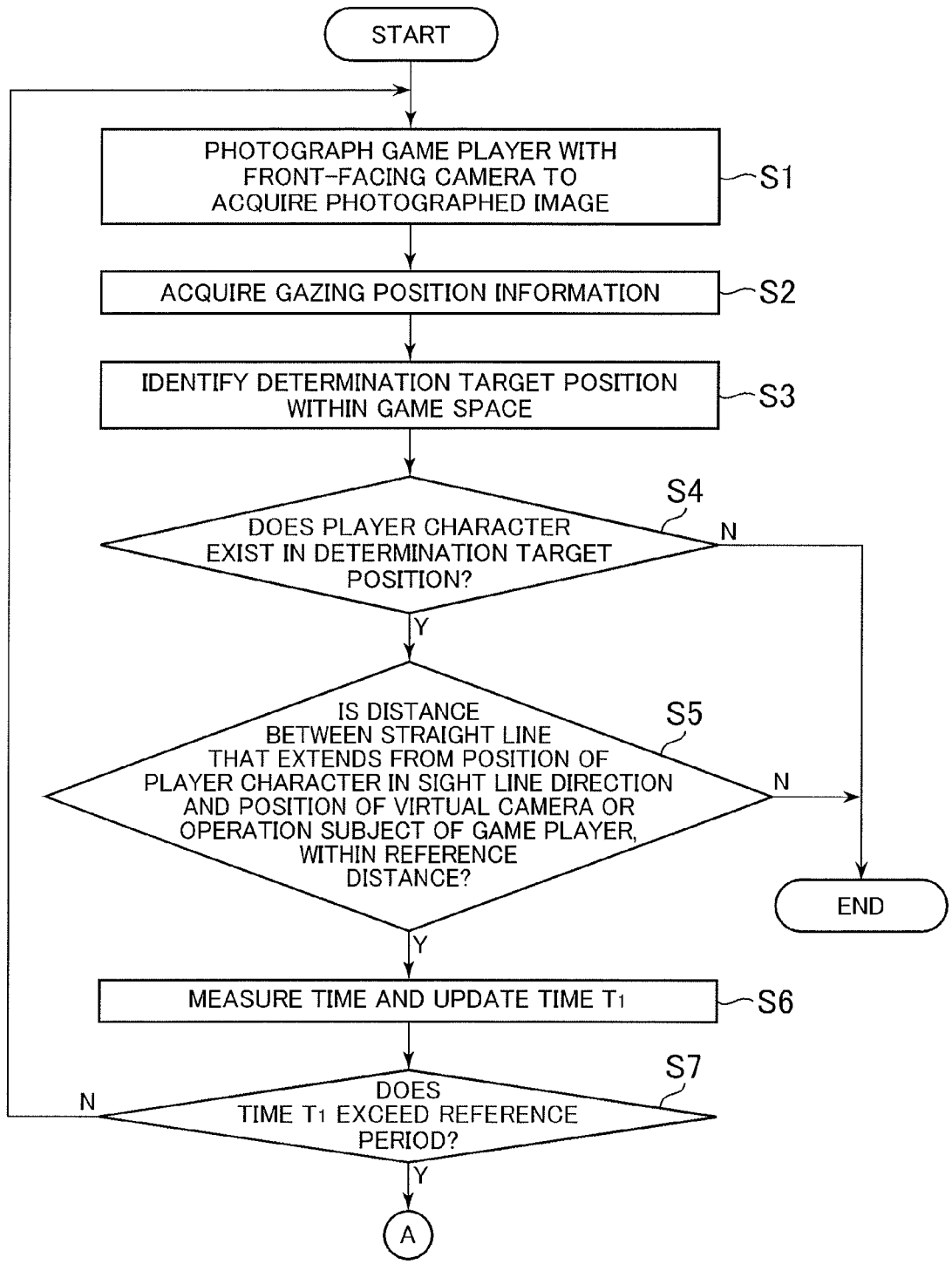
FIG. 15 is a flowchart illustrating processing executed by the game device.

FIGS. 15 and 16 are flowcharts illustrating processing executed by the game device 10. When a given condition for the game player to perform an instruction by using the sight line is satisfied, the control unit 44 executes the processing illustrated in FIGS. 15 and 16 in accordance with the program stored in the game memory card 40. The above-mentioned condition is defined in advance, and may be, for example, whether or not the game player has pressed a given button of the operation key unit 24 or whether or not the game situation data satisfies a predetermined condition.

First, as illustrated in FIG. 15, the control unit 44 photographs the game player with the front-facing camera 36 to acquire the photographed image 62 (S1). The control unit 44 acquires the gazing position information by using the corneal reflex method described above to detect the fixation point of the game player based on the photographed image 62 (S2). In this case, the gazing position information representing the two-dimensional coordinates (coordinates within the screen coordinate system) indicating the fixation point T of the game player is generated and stored as a new record in the gazing position history data.

The control unit 44 identifies the determination target position U within the game space 70 by subjecting the fixation point of the game player to the coordinate conversion processing (S3). In Step S3, a pixel existing at the fixation point within the game screen 92 is identified, and the three-dimensional coordinates of the determination target position U are identified by converting the two-dimensional coordinates (screen coordinates) of the fixation point into the three-dimensional coordinates (world coordinates) within the game space 70 based on the Z-value of the above-mentioned pixel.

The control unit 44 determines whether or not the player character 84 exists in the determination target position U (S4). It is determined whether or not the player character 84 belonging to the game player team exists within a predetermined distance from the three-dimensional coordinates of the determination target position U. When it is determined that the player character 84 does not exist in the determination target position U (S4; N), there is no player character 84 that can be instructed by the game player through the eye contact, and hence the processing is brought to an end.

On the other hand, when it is determined that the player character 84 exists in the determination target position U (S4; Y), the control unit 44 refers to the game situation data to determine whether or not the distance between the straight line L that extends from the position of the player character 84 in the sight line direction D and the position of the virtual camera 90 or the operation subject of the game player is within the reference distance (S5).

When it is not determined that the distance between the straight line L that extends from the position of the player character 84 in the sight line direction D and the position of the virtual camera 90 or the operation subject of the game player is within the reference distance (S5; N), the player character 84 is not looking at the game player, and the eye contact is not established, which brings the processing to an end.

On the other hand, when it is determined that the distance between the straight line L that extends from the position of the player character 84 in the sight line direction D and the position of the virtual camera 90 or the operation subject of the game player is within the reference distance (S5; Y), the control unit 44 uses a real-time clock to measure time, and updates a time $T_1$ (S6). The time $T_1$ represents an elapsed time since time measurement is started in Step S6, and information indicating the time $T_1$ is stored in the main memory 48.

The control unit 44 determines whether or not the time $T_1$ exceeds the reference period (S7). When it is not determined that the time $T_1$ exceeds the reference period (S7; N), the processing returns to Step S1. That is, the game player and the player character 84 have not kept staring at each other for the reference period, and hence it is determined that the eye contact has not been established yet.

When it is determined that the time $T_1$ exceeds the reference period (S7; Y), the processing advances to the flowchart of FIG. 16, and the control unit 44 displays on the game screen 92 the message 96 indicating that the eye contact has been established (S8). The message 96 is displayed so that the game player can grasp that the eye contact with the player character 84 has been established and the game player is now be able to issue an instruction to the player character 84 by using their own sight line.

The control unit 44 uses a real-time clock to measure time, and updates a time $T_2$ (S9). The time $T_2$ represents an elapsed time since time measurement is started in Step S9, and information indicating the time $T_2$ is stored in the main memory 48.

The control unit 44 photographs the game player with the front-facing camera 36 to acquire the photographed image 62 (S10). The control unit 44 acquires the gazing position information by using the corneal reflex method described above to detect the fixation point of the game player based on the photographed image 62 (S11). The control unit 44 identifies the determination target position U within the game space 70 by subjecting the fixation point of the game player to the coordinate conversion processing (S12). The processing of Step S10 to Step S12 is the same as the processing of Step S1 to Step S3, respectively. The control unit 44 moves the player character 84 that has made eye contact with the game player toward the determination target position U (S13).

The control unit 44 determines whether or not the time $T_2$ exceeds the instruction period (S14). When it is not determined that the time $T_2$ exceeds the instruction period (S14; N), the processing returns to Step S9. In this case, the game player instructs the player character 84 with which the eye contact has been established to move in the moving destination by using the sight line.

On the other hand, when the time $T_2$ is determined to exceed the instruction period (S14; Y), the processing is brought to an end.

According to the game device 10 described above, in the case where the player character 84 existing in the direction in which the game player is looking is also looking at the game player, it is possible to move the player character 84 in the direction in which the sight line of the game player moves. As a result, the game player can easily issue an instruction to the player character 84 without using an operation member. In particular, the game player can issue an instruction to another player character 84 by using the sight line while issuing an instruction to an operation subject through the operation key unit 24, and hence it is easy for the game player to simultaneously operate the plurality of player characters 84.

Further, by assuming that the eye contact has been established in a case where the game player and the player character 84 have kept staring at each other for the reference period, an actual feeling of making eye contact with a real soccer player can be obtained, which improves reality that is felt by the game player.

7. Modified Examples

Note that the present invention is not limited to the embodiment described above. Changes can be appropriately made without departing from the gist of the present invention.

(1) For example, the reference period for establishing the eye contact may be changed depending on a level of cooperation (closeness of their relationship) between the operation subject of the game player and the player character 84 with which the eye contact is being made. When the cooperation between the operation subject of the game player and the player character 84 is relatively high, the reference period may be set relatively short to establish the eye contact in a short time.

The game data storage unit 100 according to Modified Example (1) stores a game parameter (for example, cooperativeness parameter) in association with a combination of a plurality of game characters (for example, two player characters 84 (86) belonging to the same team).

FIG. 17 is a diagram illustrating an example of the cooperativeness parameter. As illustrated in FIG. 17, the cooperativeness parameter indicating the level of cooperation between two player characters 84 (86) is stored in association with the combination of the player characters 84 (86) (for example, combination of player IDs allocated to the player characters 84 (86)). In this case, the cooperativeness parameter assumes numerical values of 0 to 100, and indicates that a degree of cooperativeness between the two player characters 84 (86) becomes higher as the value of the cooperativeness parameter becomes higher.

The game device 10 according to Modified Example (1) includes reference period determination means for determining a length of the reference period based on the game parameter associated with the combination of the first game character (operation subject of the game player) and the second game character (player character 84b with which the eye contact has been established). The above-mentioned means is included in, for example, the game execution unit 102.

Figures 18, 19, 20:
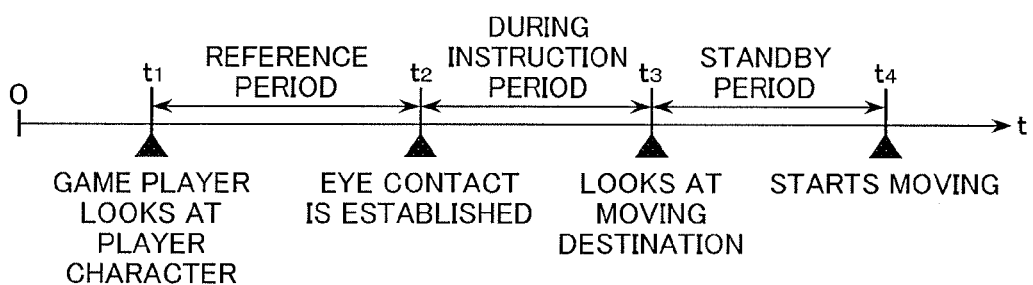
FIG. 18 is a diagram illustrating association between a condition regarding the cooperativeness parameter and a reference period.
FIG. 19 is an explanatory diagram for illustrating a flow after the game player looks at the player character to be subjected to action control until the player character starts an action.
FIG. 20 is a diagram illustrating association between the cooperativeness parameter and a standby period.

FIG. 18 is a diagram illustrating association between a condition regarding the cooperativeness parameter and the reference period. As illustrated in FIG. 18, the condition regarding the cooperativeness parameter and the reference period are associated with each other. The data on the association illustrated in FIG. 18 is stored in the game data storage unit 100. The above-mentioned data may be data having a table format or may be data having a numerical expression format.

The condition regarding the cooperativeness parameter indicates a range of the values of the cooperativeness parameter. The reference period associated with the condition satisfied by the cooperativeness parameter of the cooperativeness between the operation subject of the game player and the player character 84 (86) is set. As illustrated in FIG. 18, the length of the reference period is determined to become shorter as the cooperation between the operation subject of the game player and the player character existing in a gazing position, which is indicated by the cooperativeness parameter, becomes higher.

According to Modified Example (1), it is possible to establish the eye contact in a shorter time as the cooperation between the operation subject of the game player and the player character 84 becomes higher.

(2) Further, for example, a time to start moving may be delayed when the player character 84 is moved in Step S13 of FIG. 16, depending on a cooperativeness value parameter. When the cooperation between the operation subject of the game player and the player character is relatively high, the player character 84 starts moving immediately after the fixation point T of the game player is changed, and when the cooperation between the operation subject of the game player and the player character 84 is relatively low, the player character 84 may start moving after standing by for several seconds after the fixation point T of the game player is changed.

The game device 10 according to Modified Example (2) includes restriction means for restricting action control on the second game character (for example, player character 84b) performed by the action control unit 112 based on the game parameter (for example, cooperativeness value parameter) associated with the combination of the first game character (operation subject of the game player) and the second game character. The restriction means is included in, for example, the game execution unit 102.

For example, when the cooperativeness value parameter is within a predetermined range (when being equal to or smaller than a reference value), the action control on the player character 84 performed by the action control unit 112 is prevented from being performed. That is, the term "restricting the action control" as used herein includes "restricting execution of the action control". For example, when the value of the cooperativeness parameter corresponding to the combination of the operation subject of the game player and the player character 84 is extremely small, the action that the game player has instructed the player character 84 to perform by using the sight line is inhibited from being executed by the player character 84.

Further, a start of the execution of the action control on the player character 84 performed by the action control unit 112 stands by based on the cooperativeness value parameter associated with the combination of the operation subject of the game player and the player character 84. That is, the term "restricting the action control" as used herein includes "causing the action to stand by without immediately starting the action". A standby period for the start of the execution of the action control on the player character 84 performed by the action control unit 112 is determined based on the cooperativeness value parameter associated with the combination of the operation subject of the game player and the player character 84.

FIG. 19 is an explanatory diagram for illustrating a flow after the game player looks at the player character 84 to be subjected to the action control until the player character 84 starts the action. As illustrated in FIG. 19, first, when the game player looks at the player character 84 by moving the sight line (time $t_1$), the time measurement is started in Step S6. In a case where the reference period has elapsed, it is determined that the eye contact has been established (time $t_2$), and a period (time $t_3$ to time $t_4$) after a time point (time $t_3$) at which the game player looks at the position to which the game player desires to move the player character 84 during the instruction period until the player character 84 starts moving is set as the standby period.

FIG. 20 is a diagram illustrating association between the cooperativeness parameter and the standby period. As illustrated in FIG. 20, the condition regarding the cooperativeness parameter and the standby period are associated with each other. The data on the association illustrated in FIG. 20 is stored in the game data storage unit 100. The above-mentioned data may be data having a table format or may be data having a numerical expression format.

The standby period associated with the condition satisfied by the cooperativeness parameter of the cooperativeness between the operation subject of the game player and the player character 84 is set. As illustrated in FIG. 20, a length of the standby period is determined to be shorter as the cooperation between the operation subject of the game player and the player character 84, which is indicated by the cooperativeness parameter, is higher.

According to Modified Example (2), it is possible to cause the player character 84 to start moving in a shorter time as the cooperation between the operation subject of the game player and the player character 84 becomes higher.

(3) Further, for example, it may be determined whether or not the place at which the game player looks after the eye contact between the game player and the player character 84 has been established is a vacant space, and in a case of being the vacant space, the player character 84 may be moved. That is, when another player character 84 (86) exists in the above-mentioned space, a restriction may be imposed so as to inhibit the player character 84 with which the eye contact has been established from moving.

The action control unit 112 according to Modified Example (3) includes means for determining whether or not there is a game character other than the game character to be subjected to the action control by the action control unit 112 in a position or a region of which the game player is aware during the instruction period, based on the gazing position information acquired during the instruction period and the position of the game character (for example, player character 86 belonging to the opponent team) other than the game character (for example, player character 84b being the second game character) to be subjected to the action control by the action control unit 112.

Figure 21:
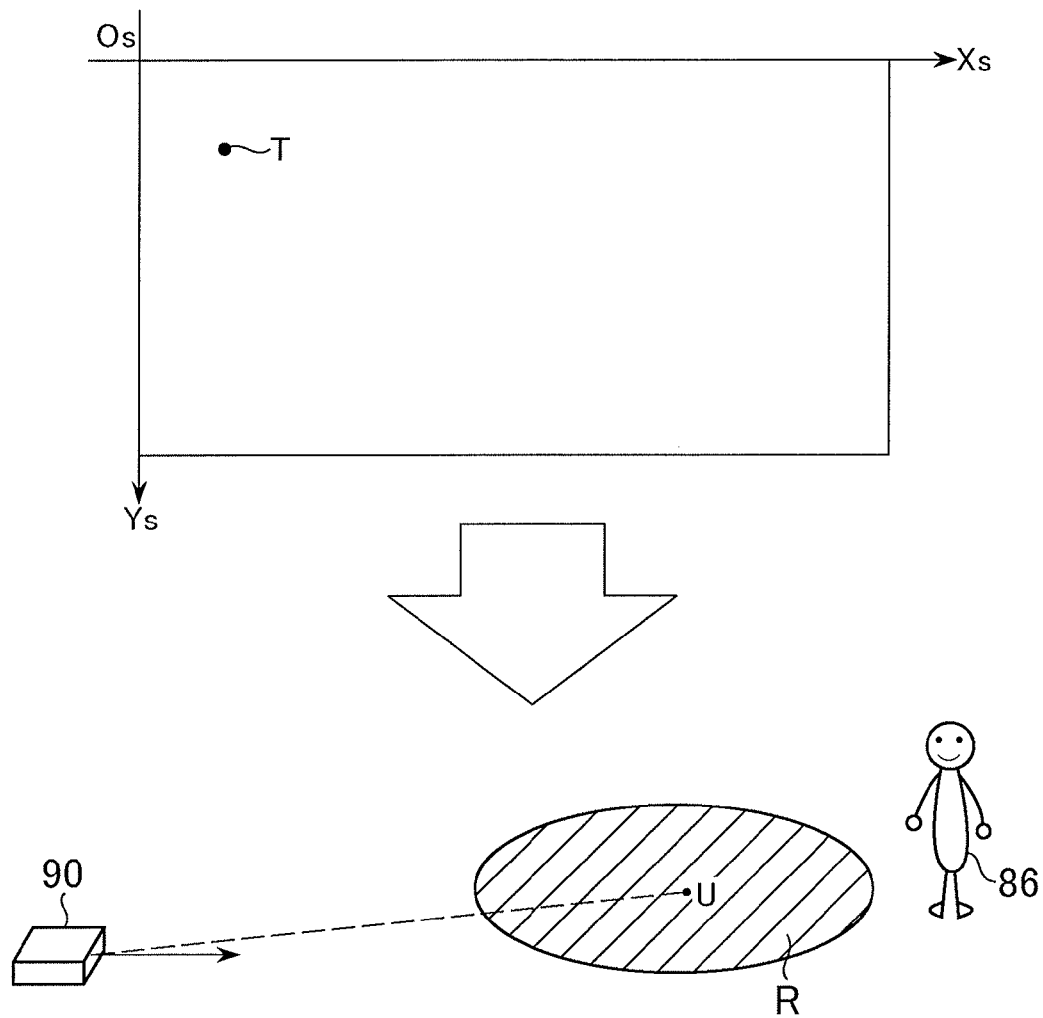
FIG. 21 is a diagram for illustrating a determination method for a vacant space.

FIG. 21 is a diagram for illustrating a determination method for the vacant space. As illustrated in FIG. 21, the determination target position U within the game space 70, which corresponds to the fixation point T of the game player at an end of the instruction period, is identified. Then, a region R within a predetermined distance from the determination target position U is identified. By determining whether or not the player character 84 (86) exists within the region R, it is determined whether or not there is another player character 84 (86) in the position or the region of which the game player is aware. Note that a distance between the determination target position U and the player character 84 (86) may be calculated, and it may be determined whether or not there is a player character 84 (86) the distance from which is within the predetermined distance.

The action control unit 112 includes means for restricting execution of the action control by the action control unit 112 when it is determined that there is a game character (for example, player character 86 belonging to the opponent team) other than the game character (for example, player character 84b being the second game character) to be subjected to the action control by the action control unit 112 in the position or the region of which the game player is aware during the instruction period. For example, when it is determined that there is a player character 86 belonging to the opponent team within the region R, the action control based on the gazing position information is prevented from being performed.

According to Modified Example (3), in a case where the position at which the game player looks after the eye contact has been established is not the vacant space, it is possible to prevent the player character 84 with which the eye contact has been established from moving to the above-mentioned position.

(4) Further, for example, it may be determined whether or not the place at which the game player is looking during the instruction period is included in the visual field of the player character 84 with which the game player has made eye contact, and the player character 84 may be moved when the above-mentioned place is included in the visual field. For example, even though the place at which the game player is looking is the vacant space, when the player character 84 is not looking at the vacant space, the player character 84 may be prevented from moving to the vacant space.

The action control unit 112 according to Modified Example (4) includes means for determining whether or not the game character is aware of the position or the region of which the game player is aware within the game space 70 during the instruction period, based on the position and the sight line of the game character (for example, player character 84b being the second game character) to be subjected to the action control by the action control unit 112 and the gazing position information acquired during the instruction period. That is, the action control based on the gazing position information is prevented from being performed when it is determined that the determination target position U or the region R is not included in the visual field E of the player character 84 with which the eye contact has been established.

According to Modified Example (4), for example, even though the position at which the game player looks after the eye contact has been established is the vacant space, when the player character 84 with which the eye contact has been established is not looking at the vacant space, the player character 84 may be prevented from moving to the above-mentioned position.

(5) Further, for example, the instruction period that allows the game player to search for the moving destination of the player character 84 may be changed depending on the cooperativeness value parameter of the cooperativeness between the operation subject of the game player and the player character 84. For example, when the cooperation between the operation subject of the game player and the player character 84 is relatively high, the instruction period may be set relatively long to allow the game player to take a long time to search for the moving destination.

The game device 10 according to Modified Example (5) includes instruction period determination means for determining a length of the instruction period based on the game parameter associated with the combination of the first game character (operation subject of the game player) and the second game character (player character 84b of which the game player is aware). The above-mentioned means is included in, for example, the game execution unit 102.

Figures 22, 23:
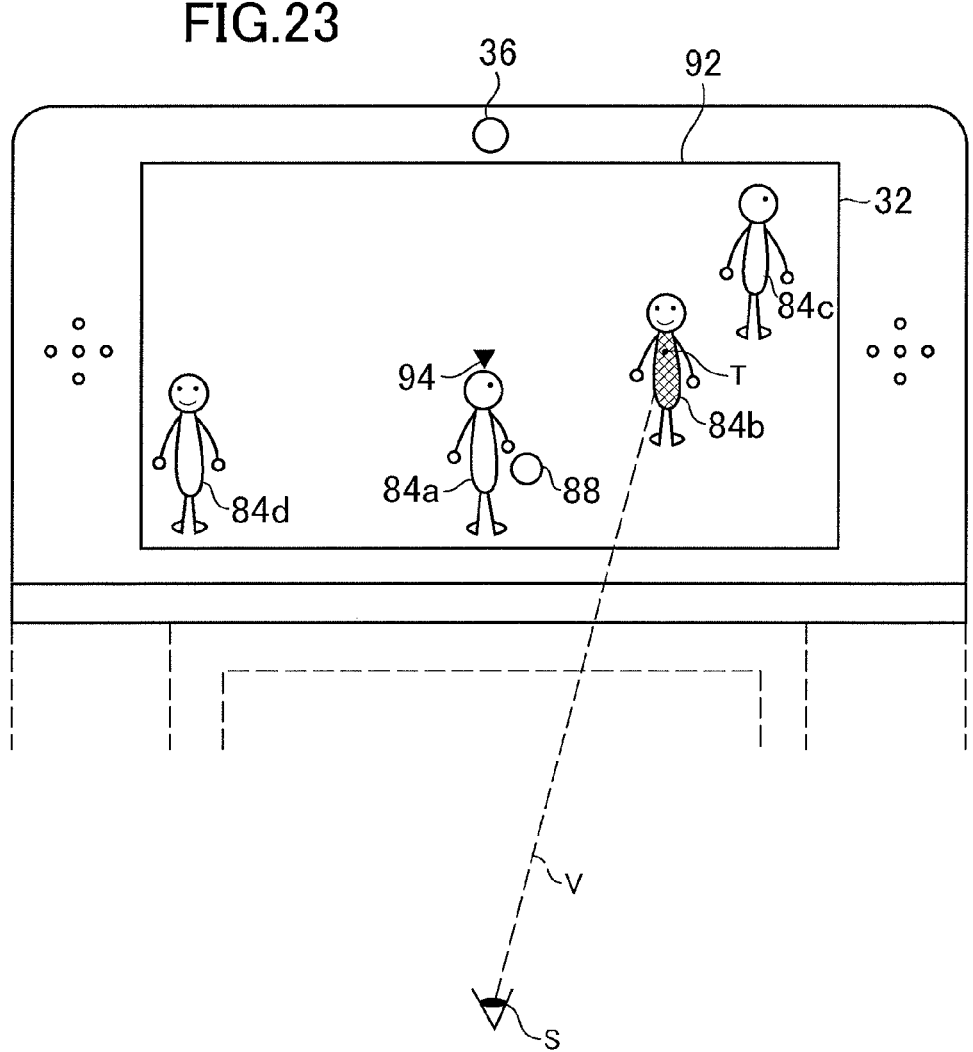
FIG. 22 is a diagram illustrating association between the cooperativeness parameter and an instruction period.
FIG. 23 is a diagram illustrating an example of a game screen according to Modified Example (6) of the present invention.

FIG. 22 is a diagram illustrating association between the cooperativeness parameter and the instruction period. As illustrated in FIG. 22, the condition regarding the cooperativeness parameter and the instruction period are associated with each other. The data on the association illustrated in FIG. 22 is stored in the game data storage unit 100. The above-mentioned data may be data having a table format or may be data having a numerical expression format.

The instruction period associated with the condition satisfied by the cooperativeness parameter of the cooperativeness between the operation subject of the game player and the player character (86) is set. As illustrated in FIG. 22, the length of the instruction period is determined to be longer as the cooperation between the operation subject of the game player and the player character 84, which is indicated by the cooperativeness parameter, becomes higher.

According to Modified Example (5), when the cooperation between the operation subject of the game player and the player character 84 is relatively high, the instruction period is set relatively long, which allows the game player to take a long time to search for the moving destination.

(6) Further, for example, the description of the above-mentioned embodiment is directed to the case where the message 96 is displayed near the player character 84 that has established eye contact with the game player, but another method may be used to inform the game player that the eye contact has been established. In addition, for example, a display mode of the player character 84 that has established eye contact with the game player may be changed.

FIG. 23 is a diagram illustrating an example of the game screen 92 according to Modified Example (6). As illustrated in FIG. 23, by changing the display mode of the player character 84b when the eye contact between the game player and the player character 84b is established, the game player is informed that the eye contact has been established. The term "changing the display mode of the player character 84b" means at least one of: changing a shape, a pattern, or a color of the player character 84b; changing a brightness of the player character 84b; emphasizing an outline of the player character 84b; and blinking the player character 84b.

According to Modified Example (6), the game player is allowed to grasp that the eye contact has been established, without averting their eye from the player character 84 that is making eye contact.

(7) Further, for example, the determination method performed by the first determination unit 108 and the determination method performed by the second determination unit 110 are not limited to the methods described above.

For example, the first determination unit 108 includes means for acquiring a position or a region of which the game player is aware within the game screen 92 based on the gazing position information, and by determining whether or not the game character (for example, player character 84b serving as the second game character) is displayed in the position or the region of which the game player is aware within the game screen 92, it may be determined whether or not the game player is aware of the game character. For example, it may be determined whether or not the player character (86) is displayed in the fixation point T of the game player or whether or not the player character 84 (86) is displayed within a predetermined region including the fixation point T.

Further, the second determination unit 110 may determine whether or not the virtual camera 90 or the operation subject of the game player exists within a region including the sight line direction D of the player character 84 (86). For example, it is determined whether or not the virtual camera 90 or the operation subject of the game player exists within a region in which a distance from the sight line direction D is within a predetermined distance within the visual field E of the player character 84 (86).

(8) Further, for example, when only one of the state in which it is determined that the game player is aware of the player character 84 (86) by the first determination unit 108 and the state in which it is determined that the player character 84 (86) is aware of the game player by the second determination unit 110 is established, the player character 84 (86) may be moved by using the sight line of the game player.

In addition, in the above-mentioned embodiment, in a case where the game player and the player character 84 (86) have kept staring at each other for equal to or longer than the reference period, the game player is allowed to issue an instruction by using the sight line, but even if the staring does not continue for equal to or longer than the reference period, the game player may be allowed to issue an instruction by using the sight line when the determination results obtained by the first determination unit 108 and the second determination unit 110 are determined.

Further, the description of the above-mentioned embodiment is directed to the case where the player character 84 (86) performs an action based on the change of the sight line of the game player during the instruction period after the eye contact has been established, but instead of setting the instruction period, the player character 84 (86) may move to the position of which the game player is aware a predetermined time after the eye contact has been established.

(9) Further, for example, the description of the above-mentioned embodiment is directed to the case where the fixation point of the game player is detected by using the corneal reflex method, but any other methods may be used to detect the fixation point of the game player as long as the fixation point of the game player is detected from the photographed image obtained by photographing the face of the game player. In addition, for example, the three-dimensional coordinates of the eyeball may be corrected by detecting the orientation of the face from the positional relationship among the respective parts of the face of the game player, or the sight line of the game player may be detected by continuously photographing the eye of the game player and tracking a change in the position of the pupil.

(10) Further, for example, the descriptions of the above-mentioned embodiment and the above-mentioned modified examples are directed to the case where the player character 84 moves in the direction obtained after the sight line of the game player is changed, but the action to be performed by the player character 84 with which the eye contact has been established is not limited thereto. In addition, for example, in a case where the player character 84 with which the eye contact has been established is keeping the ball 88, a pass may be performed in the direction obtained after the sight line of the game player is changed, or a trajectory of the fixation point T during the instruction period may be identified based on the gazing position history data to thereby move the player character 84 along the trajectory.

(11) Further, for example, the description of the above-mentioned embodiment is directed to the case where an instruction is issued to the player character 84 belonging to the same team as the operation subject of the game player by using the sight line of the game player, but the player character 86 belonging to the opponent team may move so as to correspond to the sight line of the game player. For example, by moving the player character 86 in the direction in which the game player is looking, the game player can play the game while misleading the opponent.

(12) Further, for example, the description is directed to the case where the virtual camera 90 moves while maintaining the predetermined positional relationship with the ball 88, but the virtual camera 90 may move while maintaining the predetermined positional relationship with the operation subject of the game player. In this case, the tracking target of the virtual camera 90 is the operation subject of the game player, and the position of the virtual camera 90 is determined based on the position of the operation subject of the game player. For example, the position of the operation subject of the game player may be set as the position of the virtual camera 90, or a position spaced apart from the operation subject of the game player in a predetermined direction by a predetermined distance may be set as the position of the virtual camera 90.

Further, the sight line direction of the virtual camera 90 may be determined based on the sight line direction of the operation subject of the game player. For example, the sight line direction of the virtual camera 90 is set so that the angle formed between the sight line direction of the virtual camera 90 and the sight line direction of the operation subject of the game player falls within a predetermined range (for example, within 10°).

According to Modified Example (12), what the operation subject of the game player is aware of is displayed on the game screen 92, and an object of which the game player is aware within the game screen 92 and an object of which the operation subject is aware within the game space 70 have an approximate positional relationship, and hence an actual feeling that the operation subject of the game player makes eye contact with another game character is easily obtained.

(13) Further, for example, the above-mentioned embodiment is described by taking the example of the game device 10 including two display units, but the number of display units is not limited to two, and may be one or three or more. It suffices that the sight line direction of a camera for photographing the game player is directed in the perpendicular direction of the display unit viewed by the game player.

(14) Further, for example, the game space 70 is described as a three-dimensional space as illustrated in FIG. 2, but the game space according to the present invention may be a two-dimensional game space in which the positions and the like of the player character (86) and the ball 88 are managed by two coordinate elements.

(15) Further, for example, the present invention can be applied to the game device for executing a game other than the soccer game. The present invention can be applied to a game configured so that a game character moves within a game space. For example, the present invention can also be applied to a game device for executing a basketball game, an ice hockey game, an American football game, or the like. In addition, for example, the present invention can be also applied to a game device for executing a shooting game (for example, first person shooting (FPS)), an action game, a role-playing game, and the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game configured so that a game character moves within a game space, the game device comprising:
    a game execution unit that acquires information relating to a position of the game character and a sight line thereof from a storage unit;
    a display control unit that causes a display to display a game screen showing how the game space is viewed from a virtual viewpoint;
    a gazing position information acquiring unit that acquires information relating to a position where a game player is gazing at the game screen based on an image obtained by a photographing unit that photographs a face of the game player;
    a first determination unit that determines whether or not the game player is aware of the game character based on the gazing position information and the position of the game character;
    a second determination unit that determines whether or not the game character is aware of one of the virtual viewpoint and an operation subject of the game player based on the position and the sight line of the game character and a position of the one of the virtual viewpoint and the operation subject of the game player; and
    an action control unit that causes the game character to perform one of an action corresponding to the gazing position information and a predetermined action based on determination results obtained by the first determination unit and the second determination unit.

2. The game device according to claim 1, wherein the action control unit causes the game character to perform the one of the action corresponding to the gazing position information and the predetermined action in a case where it is determined that the game player is aware of the game character and when it is determined that the game character is aware of the one of the virtual viewpoint and the operation subject of the game player.

3. The game device according to claim 2, wherein:
    the action control unit determines whether or not a state in which it is determined that the game player is aware of the game character and in which it is determined that the game character is aware of the one of the virtual viewpoint and the operation subject of the game player has continued for a reference period; and
    the action control unit causes the game character to perform the one of the action corresponding to the gazing position information and the predetermined action in a case where the state is determined to have continued for the reference period.

4. The game device according to claim 3, wherein:
    the game space comprises at least a first game character being the operation subject of the game player, and a second game character, that are disposed therein;
    the first determination unit determines whether or not the game player is aware of the second game character based on the gazing position information and a position of the second game character;
    the second determination unit determines whether or not the second game character is aware of one of the virtual viewpoint and the first game character based on a position and a sight line of the second game character and a position of the one of the virtual viewpoint and the first game character;

the action control unit determines whether or not a state in which it is determined that the game player is aware of the second game character and in which it is determined that the second game character is aware of the one of the virtual viewpoint and the first game character has continued for the reference period;

the action control unit causes the second game character to perform the one of the action corresponding to the gazing position information and the predetermined action in a case where the state is determined to have continued for the reference period; and the game execution unit acquires a game parameter from a storage unit that stores the game parameter in association with a combination of a plurality of the game characters; and determines a length of the reference period based on the game parameter associated with a combination of the first game character and the second game character.

5. The game device according to claim 1, wherein:

the game space comprises at least a first game character being the operation subject of the game player and a second game character that are disposed therein;

the first determination unit determines whether or not the game player is aware of the second game character based on the gazing position information and a position of the second game character;

the second determination unit determines whether or not the second game character is aware of one of the virtual viewpoint and the first game character based on a position and a sight line of the second game character and a position of the one of the virtual viewpoint and the first game character;

the action control unit causes the second game character to perform the one of the action corresponding to the gazing position information and the predetermined action based on the determination results obtained by the first determination unit and the second determination unit; and the game execution unit acquires a game parameter from a storage unit that stores the game parameter in association with a combination of a plurality of the game characters; and restricts action control on the second game character performed by the action control unit based on the game parameter associated with a combination of the first game character and the second game character.

6. The game device according to claim 5, wherein the game execution unit causes a start of execution of the action control on the second game character, which is performed by the action control unit, to stand by based on the game parameter associated with the combination of the first game character and the second game character.

7. The game device according to claim 1, wherein the action control unit causes the game character to perform an action based on a change of the gazing position information during an instruction period after it is determined that the game player is aware of the game character and after it is determined that the game character is aware of the one of the virtual viewpoint and the operation subject of the game player.

8. The game device according to claim 7, wherein:

the game space comprises a plurality of the game characters that are disposed therein; and the game execution unit determines whether or not a game character other than the game character to be subjected to action control by the action control unit exists in one of a position and a region of which the game player is aware during the instruction period based on the gazing position information acquired during the instruction period and a position of the game character other than the game character to be subjected to the action control by the action control unit; and restricts execution of the action control by the action control unit in a case where it is determined that the game character other than the game character to be subjected to the action control by the action control unit exists in the one of the position and the region of which the game player is aware during the instruction period.

9. The game device according to claim 7, wherein the game execution unit determines whether or not the game character is aware of one of a position and a region within the game space of which the game player is aware during the instruction period based on the position and the sight line of the game character to be subjected to action control by the action control unit and the gazing position information acquired during the instruction period; and restricts execution of the action control by the action control unit in a case where it is determined that the game character is not aware of the one of the position and the region within the game space of which the game player is aware during the instruction period.

10. The game device according to claim 7, wherein:

the game space comprises at least a first game character being the operation subject of the game player, and a second game character, that are disposed therein;

the first determination unit determines whether or not the game player is aware of the second game character based on the gazing position information and a position of the second game character;

the second determination unit determines whether or not the second game character is aware of one of the virtual viewpoint and the first game character based on a position and a sight line of the second game character and a position of the one of the virtual viewpoint and the first game character;

the action control unit causes the second game character to perform an action based on the change of the gazing position information during the instruction period after it is determined that the game player is aware of the second game character and after it is determined that the second game character is aware of the one of the virtual viewpoint and the first game character; and the game execution unit acquires a game parameter from a storage unit that stores the game parameter in association with a combination of a plurality of the game characters; and determines a length of the instruction period based on the game parameter associated with a combination of the first game character and the second game character.

11. The game device according to claim 1, wherein:

the first determination unit acquires one of a position and a region within the game space of which the game player is aware based on the gazing position information; and the first determination unit determines whether or not the game player is aware of the game character by determining whether or not the game character exists in the one of the position and the region within the game space of which the game player is aware.

12. The game device according to claim 1, wherein:

the first determination unit acquires one of a position and a region within the game screen of which the game player is aware based on the gazing position information; and the first determination unit determines whether or not the game player is aware of the game character by determining whether or not the game character is displayed in the one of the position and the region within the game screen of which the game player is aware.

13. The game device according to claim 1, wherein the second determination unit determines whether or not the game character is aware of the one of the virtual viewpoint and the operation subject of the game player by determining whether or not a positional relationship between a straight line that extends from the position of the game character in a sight line direction thereof and the position of the one of the virtual viewpoint and the operation subject of the game player comprises a predetermined positional relationship.

14. A method of controlling a game device that includes a control unit for executing a game configured so that a game character moves within a game space, the method comprising:
   acquiring, by the control unit, information relating to a position of the game character and a sight line thereof from a storage that stores the information;
   causing, by the control unit, a display to display a game screen showing how the game space is viewed from a virtual viewpoint;
   acquiring, by the control unit, gazing position information relating to a position where a game player is gazing at the game screen based on an obtained image of a face of the game player;
   determining, in a first determination by the control unit, whether or not the game player is aware of the game character based on the gazing position information and the position of the game character;
   determining, in a second determination by the control unit, whether or not the game character is aware of one of the virtual viewpoint and an operation subject of the game player based on the position and the sight line of the game character and a position of the one of the virtual viewpoint and the operation subject of the game player; and
   causing, by the control unit, the game character to perform one of an action corresponding to the gazing position information and a predetermined action based on determination results of the first determination and the second determination.

15. A non-transitory computer readable information storage medium having recorded thereon a program for causing a computer to function as a game device for executing a game configured so that a game character moves within a game space,
   the program when executed causing the computer to:
   acquire information relating to a position of the game character and a sight line thereof;
   control a display to display a game screen showing how the game space is viewed from a virtual viewpoint;
   acquire gazing position information relating to a position where a game player is gazing at the game screen based on an obtained image of a face of the game player;
   determine, in a first determination, whether or not the game player is aware of the game character based on the gazing position information and the position of the game character;
   determine, in a second determination, whether or not the game character is aware of one of the virtual viewpoint and an operation subject of the game player based on the position and the sight line of the game character and a position of the one of the virtual viewpoint and the operation subject of the game player; and
   control the game character to perform one of an action corresponding to the gazing position information and a predetermined action based on determination results of the first determination and the second determination.

* * * * *